(12) United States Patent
Fulbright

(10) Patent No.: US 6,516,510 B1
(45) Date of Patent: Feb. 11, 2003

(54) INSTALLATION TOOL FOR INSTALLING SWAGE TYPE THREADED FASTENERS

(75) Inventor: David J. Fulbright, Waco, TX (US)

(73) Assignee: Huck International, Inc., Tucson, AZ (US)

( * ) Notice: Subject to any disclaimer, the term of this patent is extended or adjusted under 35 U.S.C. 154(b) by 74 days.

(21) Appl. No.: 09/660,624

(22) Filed: Sep. 13, 2000

(51) Int. Cl.⁷ ................................................ B23P 21/00
(52) U.S. Cl. .......................................... 29/715; 29/709
(58) Field of Search ........................ 29/715, 709, 714, 29/712, 407.02, 456, 525.01, 243.523, 407.05, 525.02, 525.05; 411/277, 361

(56) References Cited

U.S. PATENT DOCUMENTS

| | | |
|---|---|---|
| 2,531,048 A | 11/1950 | Huck |
| 2,531,049 A | 11/1950 | Huck |
| 2,789,539 A | 4/1957 | Griffith et al. |
| 2,820,566 A | 1/1958 | Van Hecke |
| 2,955,505 A | 10/1960 | Schuster |
| 3,025,730 A | 3/1962 | Brilmyer |
| 3,095,776 A | 7/1963 | Brilmyer et al. |
| 3,197,840 A | 8/1965 | Van Hecke |
| 3,204,331 A | 9/1965 | Looker |
| 3,475,945 A | 11/1969 | Chirco |
| 3,593,401 A | 7/1971 | Chirco |
| 4,118,969 A | 10/1978 | Corbett |
| 4,176,436 A | 12/1979 | McCombs et al. |
| 4,299,519 A | 11/1981 | Corbett |
| 4,580,435 A | 4/1986 | Port et al. |
| 4,587,829 A | 5/1986 | Sukharevsky |
| 4,615,206 A | 10/1986 | Rosier |
| 4,796,455 A | 1/1989 | Rosier |
| 4,813,261 A | 3/1989 | Rosier |
| 4,813,834 A | 3/1989 | Smith |
| 4,867,625 A | 9/1989 | Dixon |
| 4,896,522 A | 1/1990 | Rosier |
| 5,036,572 A | 8/1991 | Rosier |
| 5,208,959 A | 5/1993 | Rosier et al. |
| 5,315,755 A | 5/1994 | Fulbright et al. |
| 5,548,889 A | 8/1996 | Smith et al. |
| 5,598,619 A | 2/1997 | Rosier |
| 5,604,968 A | 2/1997 | Fulbright et al. |

Primary Examiner—Gregory M. Vidovich
Assistant Examiner—John C. Hong
(74) Attorney, Agent, or Firm—Harness, Dickey & Pierce P.L.C.

(57) ABSTRACT

A fastener system for multi-piece swage type fasteners, including a pin and a collar, and providing a stump type fastener constructed to be set as a pull type fastener with the fastener pin having a threaded gripping portion and including a compact installation tool having a swage anvil and a rotary threaded member adapted to be threaded onto the threaded pull portion of the pin whereby a relative axial force is applied between the pin and the collar via the rotary threaded member and swage anvil to cause the anvil to radially overengage the collar to swage it into locking grooves on the pin and the pull portion remaining on the pin after installation and with the swage anvil being connected to a piston rod of a piston for axially reciprocating movement for swaging the collar with the rotary threaded member being axially fixed and with the swage anvil and rotary threaded member being offset from the remainder of the tool whereby the tool can be used to install such fasteners in applications of limited clearance.

21 Claims, 11 Drawing Sheets

INSTALLATION TOOL FOR INSTALLING SWAGE TYPE THREADED FASTENERS

SUMMARY BACKGROUND OF THE INVENTION

The present invention relates to a fastener system for multi-piece swage type threaded fasteners and an installation tool for installing such fasteners, and having a compact structure adaptable for use in applications with restricted clearance.

The present invention is related to fastener systems and installation tools as shown and described in U.S. Pat. No. 5,315,755 issued May 31, 1994, U.S. Pat. No. 5,548,889 issued Aug. 27, 1996 and U.S. Pat. No. 5,604,968 issued Feb. 25, 1997 all to D. Fulbright et al.

Swage type fasteners are frequently of a two-piece construction comprising a pin and a collar adapted to be swaged into locking grooves on the pin. Conventional swage type fasteners are shown in U.S. Pat. Nos. 2,531,048 and 2,531,049 to L. Huck both issued on Nov. 21, 1950 and are pull type swage fasteners. In the typical pull type fastener, the pin is provided with an enlarged head and a pin shank having locking grooves in a lock groove portion; the pin shank terminates in an elongated pintail portion constructed with pull grooves adapted to be gripped by a jaw assembly of an installation tool. A swage anvil is provided on the tool to engage and swage the collar into the locking grooves. A relative axial force is applied between the pin and collar, and hence between workpieces to be fastened together, as the tool pulls on the pin via the pintail portion with the force being reacted by the engagement of the swage anvil with the collar. This relative axial force pulls the workpieces together under an initial clamp load.

As the relative axial load increases the swage anvil moves axially to radially overengage the collar, swaging it into the locking grooves, whereby the pin and collar are locked together and the final clamp load on the workpieces is developed.

Typically the pintail portion is connected to the locking groove portion by a breakneck groove which is constructed to break at a preselected axial load after the swaging step has been completed whereby the pintail portion is severed and discarded.

In the stump type version, the lockbolt is set by a squeeze type tool which has a stationary member at one end of the workpieces for engaging the pin head and a swage anvil at the opposite end for engaging the collar. The fastener is set as the anvil moves axially against and radially over the collar with the axial force being reacted by the engagement of the stationary member with the pin head. Thus the stump type fastener has the advantage of a shorter pin shank since the pintail portion with pull grooves and breakneck groove is not required. Because of the latter the stump version has the advantage of being lighter and of a lower cost.

But there are other advantages of the stump type swage fastener relative to the pull type fastener. With the pull type fastener, the severed pintail portion creates debris in the work area requiring periodic collection and disposal. Also the stump version will assure a smooth, finished end at the pin shank whereas the pull type pin shank will occasionally have a rough surface from the break at the breakneck groove. Finally the noise occasioned by pin break is absent in the stump type fastener.

There are, however, numerous applications in which a stump type fastener cannot be used or it is not expedient to do so. One example is an assembly in which there is insufficient clearance on the pin head side of the workpieces to permit access for the related stationary portion of the squeeze tool. A similar example for a pull type fastener is an assembly having insufficient clearance to permit insertion of the longer pull type pin into the mating openings of the workpieces and engagement by the installation tool. The present invention addresses such problems. Thus with the present invention a unique fastening system including a swage type fastener and installation tool is provided for a pull type installation but, as will be seen, having advantages of a stump type fastener and installation. Indeed, where both squeeze type and pull type applications and apparatus are present, the swage type threaded fastener can be installed in either application resulting in a reduction in overall inventory and in the numbers of different parts to be stocked. At the same time the installation tool of the present invention can be used to install the swage type threaded fasteners in close clearance applications and thus provides even greater versatility for use of such fasteners.

The present invention is directed to an installation tool for a swage type threaded fastener, as shown in the above patents to Fulbright et al, with a pin having a shank constructed without a severable pintail portion but terminating in a short, threaded or other grippable, pull portion of minimal length. A unique tool is shown which functions to provide a pull type installation for general use but also with specific use in applications with limited clearance. As with the installation tool of the above patents to Fulbright et al the tool includes a threaded, hardened nut member adapted to threadably engage the short pull portion of the pin via rotation by a rotary drive motor. Once a sufficient number of threads have been engaged or gripped by the nut member, the pull tool is actuated to apply a relative axial force by pulling on the pin, through the nut member, with a swage anvil engaging the collar to react the pulling force. At this juncture, the fastening system performs similarly to a conventional pull type installation system. Thus as the magnitude of the relative axial force increases the workpieces being secured are pulled and clamped together under a desired preload. Upon further increases in the axial force the anvil will be moved axially to radially overengage the collar and swage it radially into the locking grooves on the pin shank providing the final clamp load. Next the direction of relative axial force between the swage anvil and nut member is reversed moving the swage anvil in the opposite axial direction to thereby eject the swaged collar. Finally, the hardened nut member is reverse rotated from the short, threaded pull portion removing the installation tool and completing the installation. A rotary drive motor in the pull tool is used to thread the nut member onto and off from the threaded pull portion.

In the above patents to Fulbright et al pins with numerous forms of pull grooves and lock grooves are shown. In addition various forms of collars are shown, i.e. some with a mating female thread of limited extent, etc. As will be seen the unique installation tool of the present invention can be readily used with any of such constructions.

One such fastener structure utilizes a collar with a limited thread and is shown and described in the U.S. Pat. No. 4,867,625 issued Sep. 19, 1989 to R. Dixon for "Variable Clamp Fastener and Method". Alternatively, a collar with a flexible tab can be used for fit-up; such a structure is shown in the U.S. Pat. No. 4,813,834 for "Fit-Up Fastener With Flexible Tab-Like Structure and Method of Making Same" issued Mar. 21, 1989 to Walter J. Smith. Both of such fasteners are sometimes referred to as "fit-up fasteners".

In a preferred form of the invention, the tool nut member is designed simply to threadably engage and thereby grip the minimum length pull portion of the pin; thus, in this first step, the tool nut member is not moved against the collar with any significant force and hence is not used to pull the workpieces together and/or clamp them under an initial preload. After the threaded engagement step, the installation tool is actuated to cause the swage anvil to move axially against the collar in response to a relative axial force applied between the nut member and the anvil. Thus the initial clamp up and preload of the workpieces is substantially provided for the first time by the relative axial force applied between the nut member as engaged with the pull portion of the pin shank and the engagement of the swage anvil with the collar. As previously described, the relative axial force is increased until the swage cavity of the anvil is moved axially to radially overengage the collar swaging the collar material into the pin. With this construction, the rotary drive motor for the nut member simply provides the function of threading the nut member on and off the short pull portion of the pin shank and is not used to apply any significant axial load to the workpieces. Thus the capacity of the drive motor can be small permitting the overall size of the installation tool to be minimized.

As will be seen from the description of the installation tool which follows, various forms of the installation tool can be used for installation of such fasteners in various applications with limited clearance. Indeed it will also be seen that the installation tool of the present invention is of a construction which is readily adaptable for use in applications where limited clearance is not a problem.

Thus it is an object of the present invention to provide a novel fastener system including swage type threaded fasteners having the advantages of a stump type fastener and being installed generally as a pull type fastener with an installation tool of unique design.

It is another object of the present invention to provide a novel fastening system including a unique installation tool for use in setting swage type fasteners.

It is another general object to provide a unique fastening system including a unique installation tool of a compact structure for installing swage type threaded fasteners in limited clearance applications.

Other objects, features, and advantages of the present invention will become apparent from the subsequent description and the appended claims, taken in conjunction with the accompanying drawings, in which:

FIG. 9a is a sectional view of the motor mount housing of FIG. 9 taken generally along the line 9a—9a in FIG. 9;

FIG. 9b is a top elevational view of the motor mount housing of FIG. 9;

FIG. 10a is a top elevational view of the mounting bracket and sensor housing of FIG. 10;

FIG. 10b is a sectional view of the mounting bracket and sensor housing of FIG. 10 taken generally along the lines 10b—10b in FIG. 10a;

Figure 1:
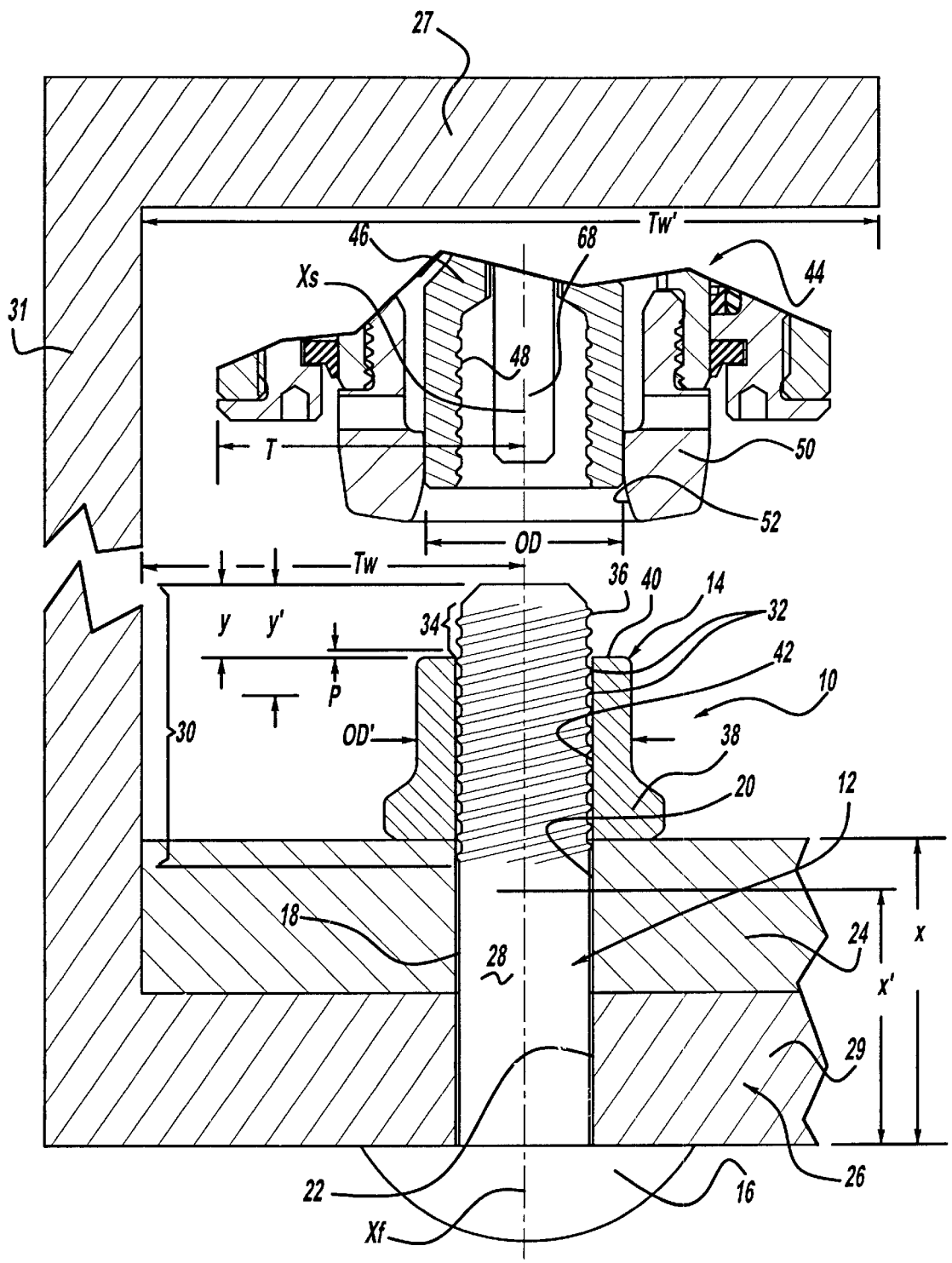
FIG. 1 is an elevational view with some parts shown broken away and others shown in section of a swage type threaded fastener including a pin and a collar shown in relationship to a portion of a tool of the present invention for installing the fastener with the tool not yet applied to the fastener for installing the fastener.

Referring to FIGS. 1 through 4, there is shown a multi-piece fastener 10 of the type shown in the above noted patents to Fulbright et al and as such includes a pin 12 and tubular collar 14. The pin 12 includes an enlarged head 16 and a pin shank 18 adapted to be received in aligned openings 20 and 22 in a pair of workpieces 24 and 26, respectively. As noted, the present invention is directed to a unique insallation tool for installing the fastener 10 with specific advantage in limited or close clearance applications. Thus the workpieces can include constructions such as I-beams or C-channels whereby the fastener to be installed is located in the partially enclosed areas defined by such structures. By way of example, the workpiece 26 is a C-channel structure having an upper plate 27 and a lower workpiece plate 29 which are connected to and extend transversely from a center plate 31. The workpiece 24 then is adapted to be fastened to the inner surface of the lower workpiece plate 29 by the fastener 10 with the insallation tool of the present invention being of a compact structure adapted to install the fastener 10 in the limited clearance between the workpiece 24 and the upper plate 27. It should be understood, of course, that the workpiece 24 could be secured to the outer surface of the workpiece plate 29.

The fastener 10 is a swage type threaded fastener with the pin 12 being of a stump type construction but which is adapted to provide insallation as a pull type fastener. The insallation tool of the present invention can be readily adapted to install the various forms of fasteners shown and described in detail in the above patents to Fulbright et al and thus the details of these fastener variations have been omitted for purposes of simplicity and as such the disclosures of those patents are incorporated herein by reference.

Thus the pin shank 18 is constructed without a pintail portion and therefore without a breakneck groove for severing such pintail portion. Pin shank 18 has a smooth shank portion 28 adjacent the enlarged head 16 followed by a lock groove portion 30 (in brackets) having locking grooves 32 and terminating in a short pull portion 34 (in brackets) having helical pull grooves 36. In the embodiment shown in FIGS. 1–4 the lock grooves 32 and pull grooves 36 are defined by a uniform, continuous helical thread which can be of a standard thread form such as a UNC and/or UNF thread form. Collar 14 is of a cylindrical construction with an elongated collar shank 40 terminating at one end in an enlarged flange 38. The collar 14 is adapted to be received upon the threaded lock groove portion 30 via a smooth through bore 42 of generally uniform diameter. As noted, however, the collar 14 could be of a "fit-up" form previously described.

The fastener 10 can be used to join members together such as workpiece 24 and workpiece plate 29 of varying combined thicknesses from a maximum thickness X to a minimum thickness X'. The length of the pin shank 18 is selected to be minimal to accommodate workpieces varying in such total thickness within this grip range and also to facilitate use in limited clearance applications. In order to accomplish this, the pull portion 34 is maintained at a minimal length. Thus the pull portion 34 is of a short, limited length Y such that the excess length of pin shank 18 extending beyond the outer end of collar 14 will be Y for a maximum grip condition X and a greater distance of Y' for a minimum grip condition X'. As will be seen, the length Y of pull portion 34 is selected to provide a sufficient number of threads to accept the pulling force to be applied therethrough to set the fastener 10 as a pull type fastener.

FIGS. 1–4 show a portion of a tool 44 constructed in accordance with the present invention for installing the swage type threaded fastener 10. The tool 44 comprises a rotary nut member 46 having internal gripping threads 48 sized to threadably engage the helical pull grooves 36 of pull portion 34. The tool 44 further includes an annular anvil member 50 having a swage cavity 52 which receives the nut member 46 which is held substantially axially stationary. As will be seen, the anvil member 50 is connected to the outer end of a piston rod and is adapted for axial movement relative to the nut member 46. The swage cavity 52 of the anvil 50 is of a generally circular cross section of a minimum diameter OD which is smaller than the circular outside diameter OD' of collar shank 40 such that as the anvil 50 moves axially along and radially over collar shank 40, the collar material is swaged radially into the helical locking grooves 32 on pin shank 18, thereby securing the pin 12 and collar 14 to each other and fastening the workpiece 24 and lower workpiece plate 29 together under a desired clamp load.

Figure 2:
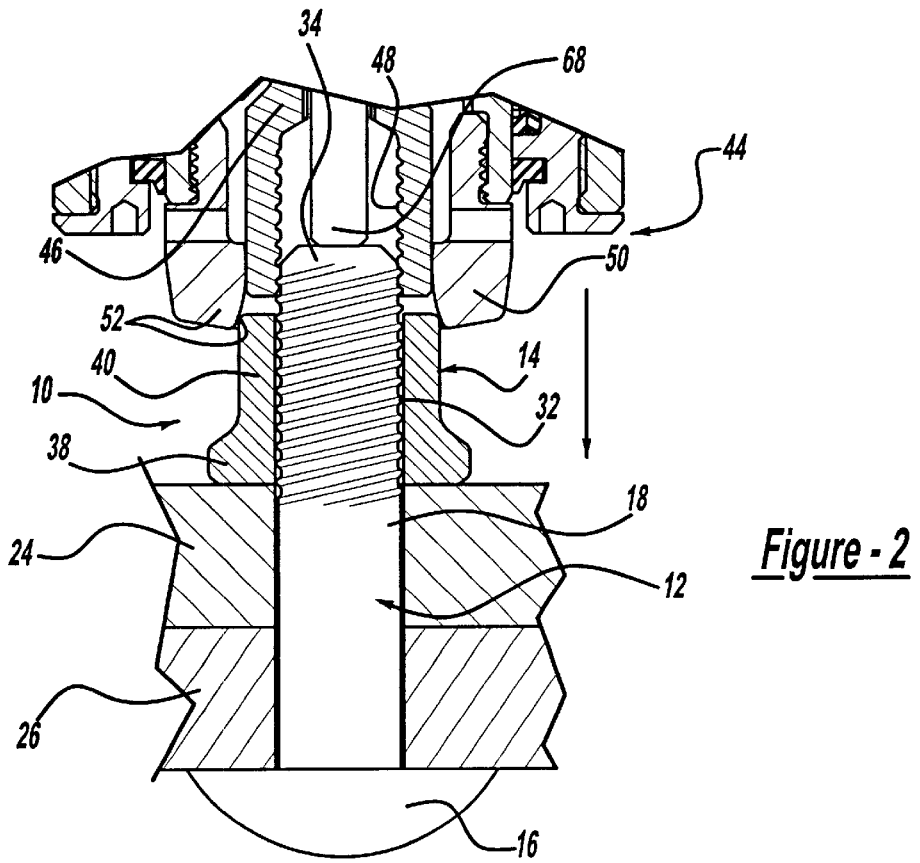
FIG. 2 is a view, to reduced scale, of the fastener and tool portion of FIG. 1 shown after a nut member of the tool portion has been initially threadably applied to a threaded pull portion of the pin.
Figure 3:
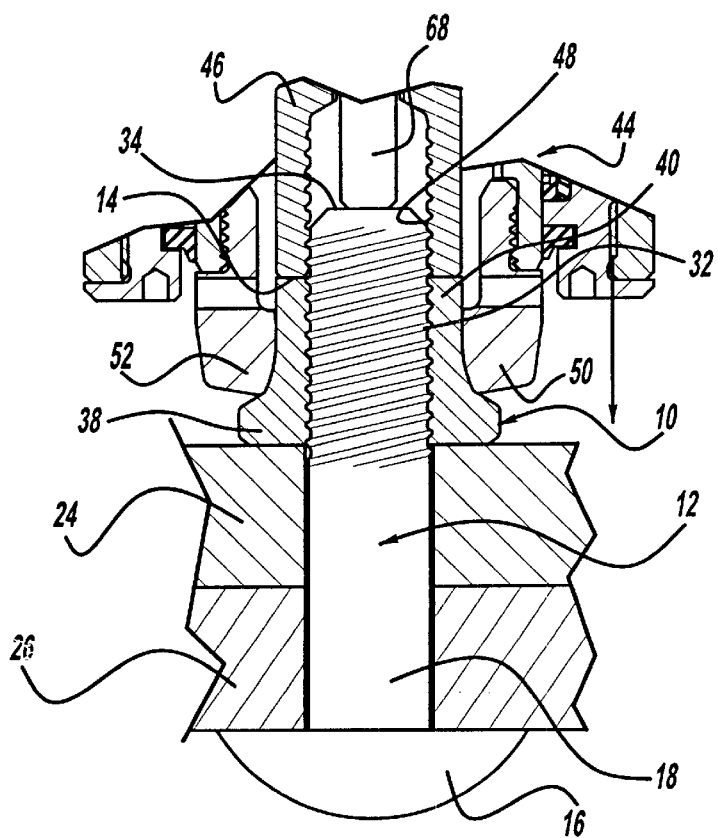
FIG. 3 is a view, to reduced scale, of the fastener and tool portion of FIG. 1 shown after the collar has been swaged via a swage anvil into locking grooves on the pin.

FIG. 2 shows the tool 44 after nut member 46 has been threaded to a predetermined position onto the pull portion 34 of pin shank 18 to initially grip the pin 12. Next, as shown in FIG. 3, the tool 44 is actuated to cause the anvil member 50 to move axially forwardly relative to the nut member 46 and hence relative to the gripped pin 12. This action brings the swage anvil member 50 into engagement with the outer end of the collar shank 40 to apply a relative axial force between the pin 12 and collar 14. As this force continues the workpiece 24 and workpiece plate 29 are initially clamped together under a desired preload. The relative axial force increases moving the anvil swage cavity 52 axially outwardly to radially overengage the collar shank 40 to swage the collar material radially into the locking grooves 32 of the pin 12. (See FIG. 3.)

Figure 4:
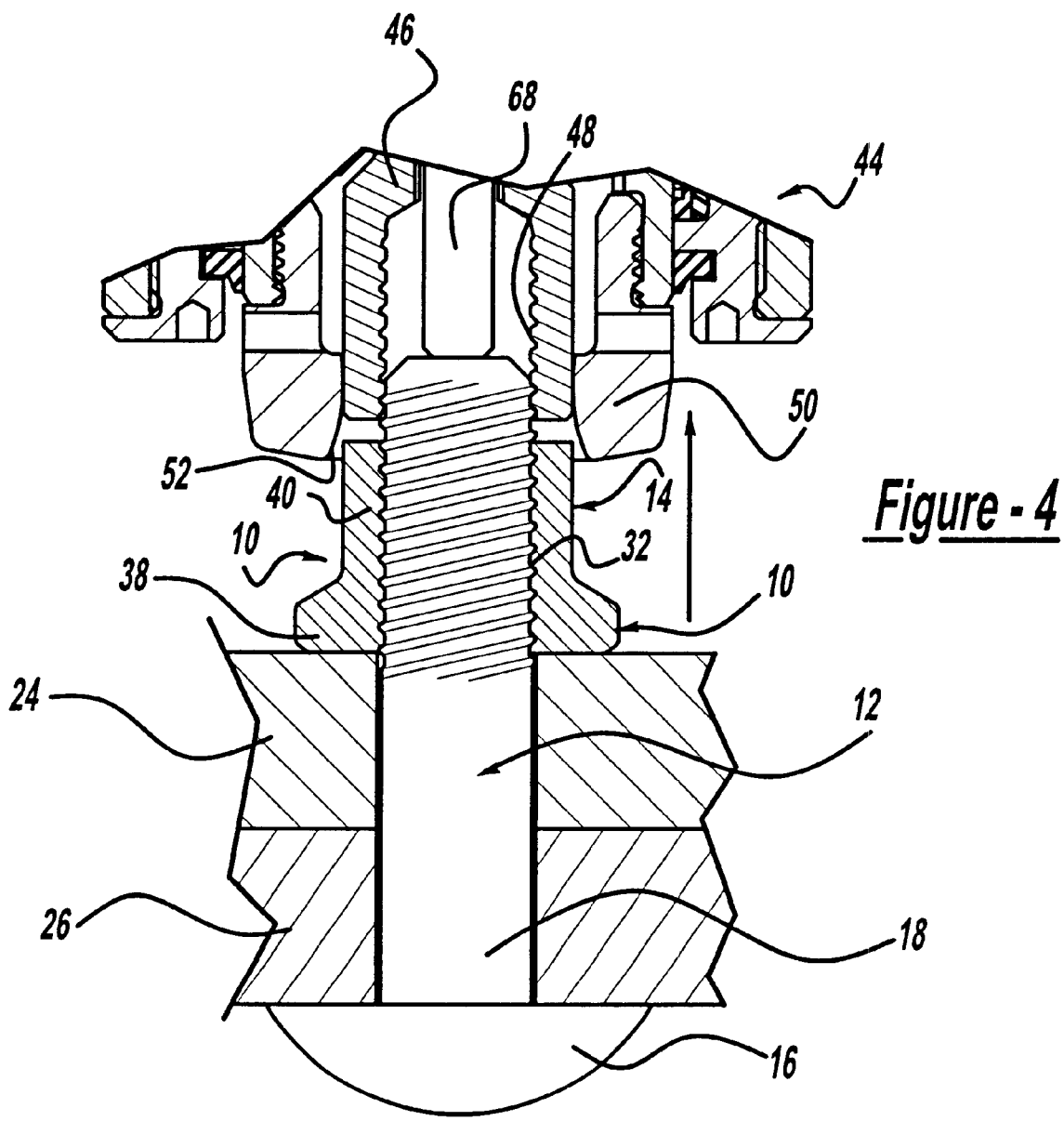
FIG. 4 is a view, to reduced scale, of the fastener and tool portion of FIGS. 1–3 shown after the swage anvil of the tool portion has ejected the swaged collar but while the nut member of the tool portion is still threadably engaged with the pull portion of the pin.

After the swaging step has been completed the relative axial force between the swage anvil 50 and the nut member 46 is reversed whereby the swage anvil 50 is moved axially inwardly and thus ejected or removed from the swaged collar shank 40 (see FIG. 4). The nut member 46 is now rotated in reverse to remove it from the pin pull portion 34 and the insallation is complete; with workpiece 24 and workpiece plate 29 of maximum grip or combined thickness X, the set fastener 10 will have a minimal excess length Y of pin shank 18 extending beyond the outer end of the collar shank 40.

In a preferred form of the invention, the pull portion 34 at maximum grip X is located a minimal clearance distance of around one thread pitch P from the outer end of the collar shank 40 after initial clamp up and prior to swage (see FIGS. 1 and 2). This clearance P is selected to avoid engagement of the outer end of collar shank 40 with the nut member 46 upon elongation of the shank 40 from swage whereby loading of the engaged threads between the nut member 46 and pull portion 34 is avoided or negligible such that the removal torque required on the nut member 46 can be kept low permitting the use of a small capacity rotary motor whereby the overall size of tool 44 can be minimized while minimizing wear on the gripping threads 48.

The internal gripping threads 48 of the nut member 46 are of greater strength than the threaded pull grooves 36. Nut member 46 can be formed from a high strength alloy or case hardened material having a hard, wear-resistant surface on its internal gripping threads 48. In one form of the invention nut member 46 was formed of a ferrous material having a Rockwell hardness of around 50 Rc. In the form of the fastener 10 of FIGS. 1–4 the pin 12 can be constructed of a ferrous material and have a Rockwell hardness of around 33 to around 39 Rc for a grade 8 type fastener and a hardness of around 25 to around 35 Rc for a grade 5 type fastener; however, in order to enhance the strength of the pull grooves 36 and hence minimize the necessary overall length of pull portion 34, the pull portion 34 can be hardened to a Rockwell hardness of at least around 5 Rc greater than the hardness of the remainder of the shank or preferably around 15 Rc harder. In any event it is desirable that no more than around four threads or pull grooves 36 be required to sustain the relative axial pulling loads required to set the fastener 10. In this regard, it is desirable that the number of pull grooves 36 be selected having a shear strength no greater than around 30% and preferably 20% more than that required to sustain the maximum load applied to the fastener 10 by the tool 44 to set the fastener 10 in a maximum grip condition. Thus the number of threads of the helical pull grooves 36 engaged is selected to provide adequate strength to withstand the relative axial pulling load to be subsequently applied in setting the fastener 10. In this regard, the minimization of the number of pull grooves 36 required for swage also assists in the use of the fastener 10 in close clearance applications.

In the embodiment shown in FIGS. 1–4 the internal gripping threads 48 on nut member 46 and threaded pull grooves 36 can be of a generally conventional, mating construction. However, it may be advantageous to use a somewhat modified thread on the nut member 46 such as that shown and described in the above noted patents to Fulbright et al.

Figure 12:
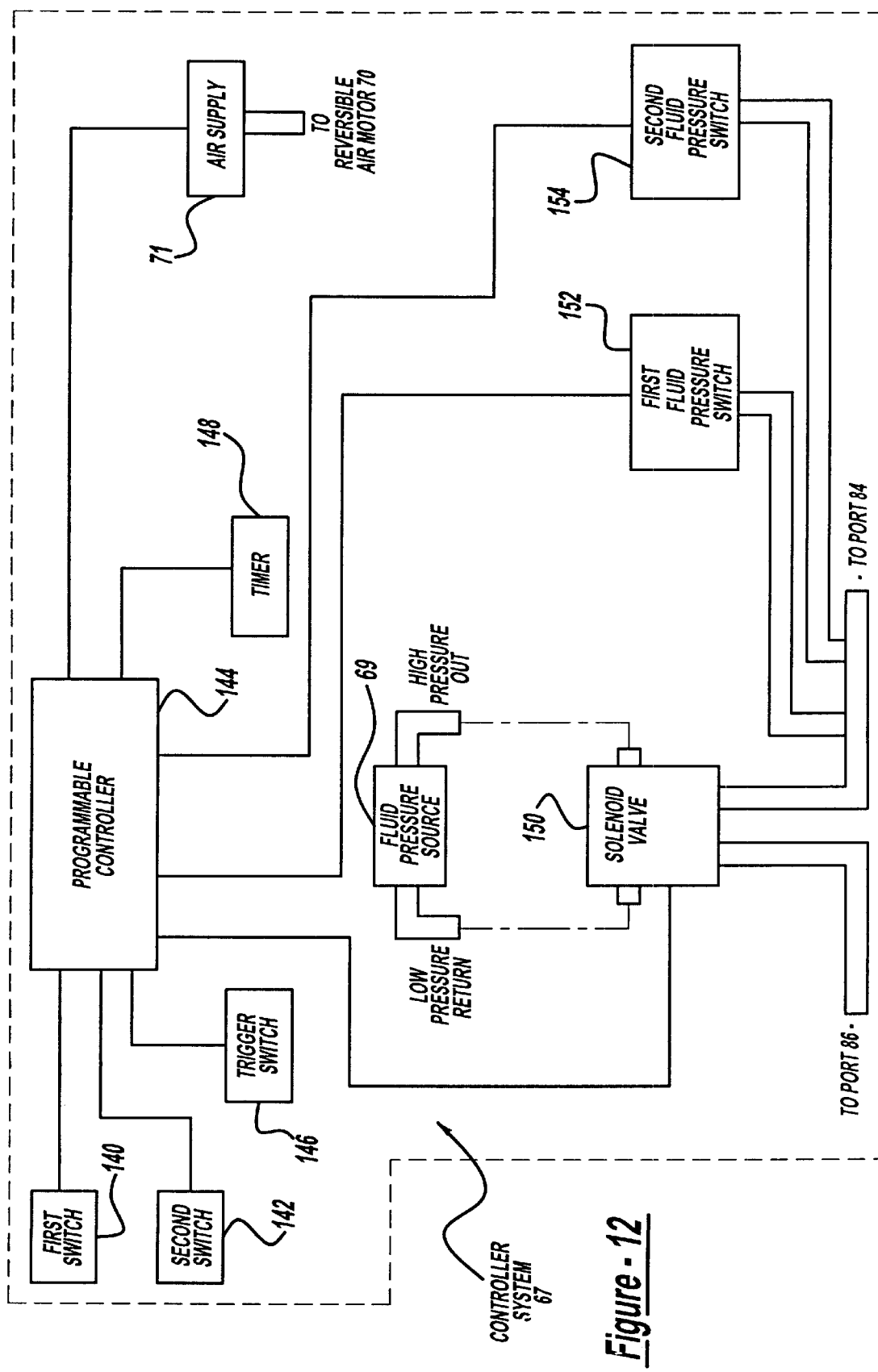
FIG. 12 is a block diagram of a controller system for the installation tool of FIGS. 5–7.

The tool 44 represents a unique element of the fastening system of the present invention and is shown in greater detail in FIGS. 5–11. FIGS. 5–11 illustrate structural features of the tool 44 operating in accordance with the sequence shown in FIGS. 1 through 4 and is shown in combination with a controller system 67 as illustrated in FIG. 12 and to be described. Certain elements of the controller system 67 will conventionally be located at a position spaced from the tool 44 while other elements such as elements 140, 142 and 146, to be described, are integral with the tool 44.

As will be seen, the basic function and operation of the insallation tool 44 is essentially the same as shown and described in the above noted patents to Fulbright et al. Thus looking to FIGS. 5–11, the tool 44 has a swage section 56 for providing the relative axial force required for the swage operation, a rotary drive section 58 for providing the rotation of the nut member 46 for threaded engagement and disengagement with the helical pull grooves 36 and a sensor section 60 for sensing the amount of such threaded engagement. As noted, however, the insallation tool 44 of the present invention is of a unique compact construction which permits insallation of the swage type threaded fastener 10 in close clearance applications. At the same time the insallation tool 44 is of a compact construction which is readily adaptable for use in a substantial range of clearances as well as use in general applications where clearance is not a problem. In this regard, the unique construction for close clearance applications is facilitated by minimizing the overall axial length L of the swage section 56 of the tool 44 which applies the relative axial force for swaging the fastener 10. This is assisted by a radially offset, construction of the sensor section 60 for sensing the various conditions of the extent of threaded engagement of the rotary nut member 46 with the pull grooves 36 which, as will be seen, is used to control the proper operation of the tool 44. In this regard, and as will be seen, the unique construction for applying the relative axial force for swage also permits a minimization of the lateral or transverse dimension T of the swage section 56 whereby the depth of movement of the swage section 56 within the confines of a C-channel or I-beam for engaging a fastener 10 can be optimized. Also the amount of overall radial offset of the apparatus related with the swage section 56 of the tool 44 can be readily varied whereby the overall transverse or lateral dimension T' and hence depth of movement of the swage section 56 within the confines of a C-channel or I-beam can also be optimized.

The sensor section 60 has a sensing rod 68 which extends axially through nut member 46 to a preselected position to detect the extent that the nut member 46 has been threadably moved onto the pull portion 34 of pin shank 18. The rotary drive section 58 includes a reversible rotary pneumatic air motor 70 which is operatively connected to the nut member 46 in a manner to be described. As the nut member 46 is rotated by the reversible air motor 70 it advances axially on the pull portion 34 until the sensing rod 68 contacts the end surface of pin shank 18 and is moved axially rearwardly relative to nut member 46. The rearward movement of sensing rod 68 and/or a timer is used to determine actuation of a source of compressed air 71 for the rotary motor 70 that rotates nut member 46. The movement of sensing rod 68 may also be used to determine actuation of a source of fluid pressure 69 to move anvil member 50 axially relative to nut member 46 such that it will first engage the outer end of the collar shank 40 to apply an initial preload to the workpiece 24 and lower workpiece plate 29 and then upon continued actuation will move axially to radially overengage the collar 14 swaging it into locking grooves 32 on the pin shank 18.

The reversible rotary air motor 70 has a pair of pressure lines 79 and 81 which are adapted to conduct air pressure from the source of air 71. For threading rotation the line 79 is pressurized while for unthreading rotation the other line 81 is pressurized. The pressurized air is evacuated from a muffler 77.

The tool 44 has interconnecting housings for operatively securing the swage section 56, rotary drive section 58 and sensor section 60 together. Thus the swage section 56 has a cylinder housing 76 having a central, longitudinal axis Xs and is internally contoured to form a fluid cylinder 78. A cylindrically formed piston 80 is located in the cylinder housing 76 and supported in the cylinder 78 for reciprocating movement in response to selective introduction and evacuation of hydraulic fluid into and from the cylinder 78 through ports 84 and 86 in the cylinder housing 76. The piston 80 includes a piston head 102 with a piston rod 104 extending axially forwardly. The outer end 107 of the piston rod 104 is threadably connected to the swage anvil member 50 whereby the piston 80 and hence swage anvil 50 will move axially relative to the nut member 46 as shown in FIGS. 1 through 4 to swage collar 14 onto pin 12. The piston head 102 is provided with an axial through bore 118 of minimal diameter which communicates both sides of the cylinder 78 to inhibit cavitation during reciprocal movement of the piston 80.

Figure 6:
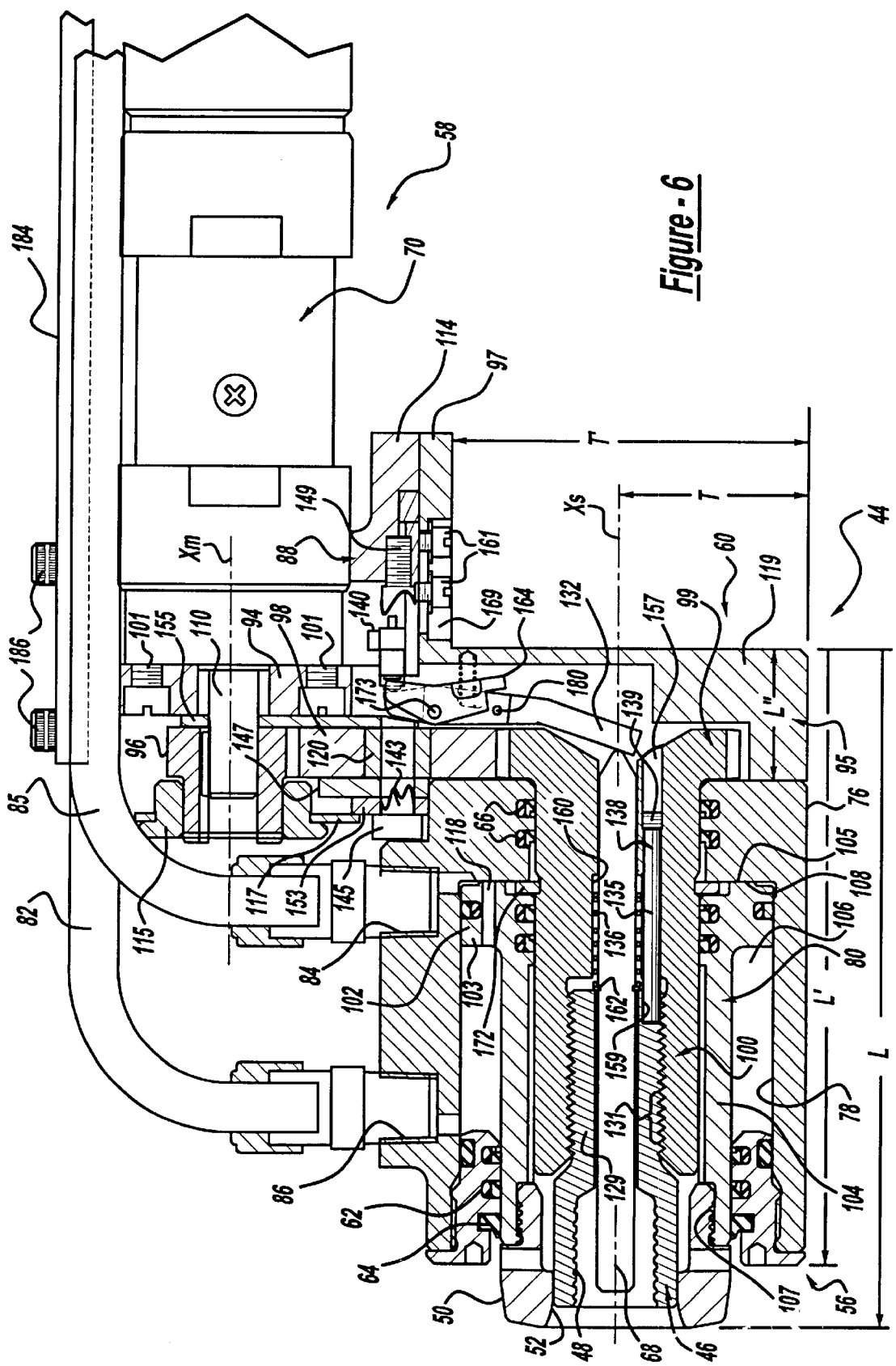
FIG. 6 is a fragmentary view to enlarged scale of the portion of the installation tool of FIG. 5 taken generally in the Circle 6 in FIG. 5.
Figure 7:
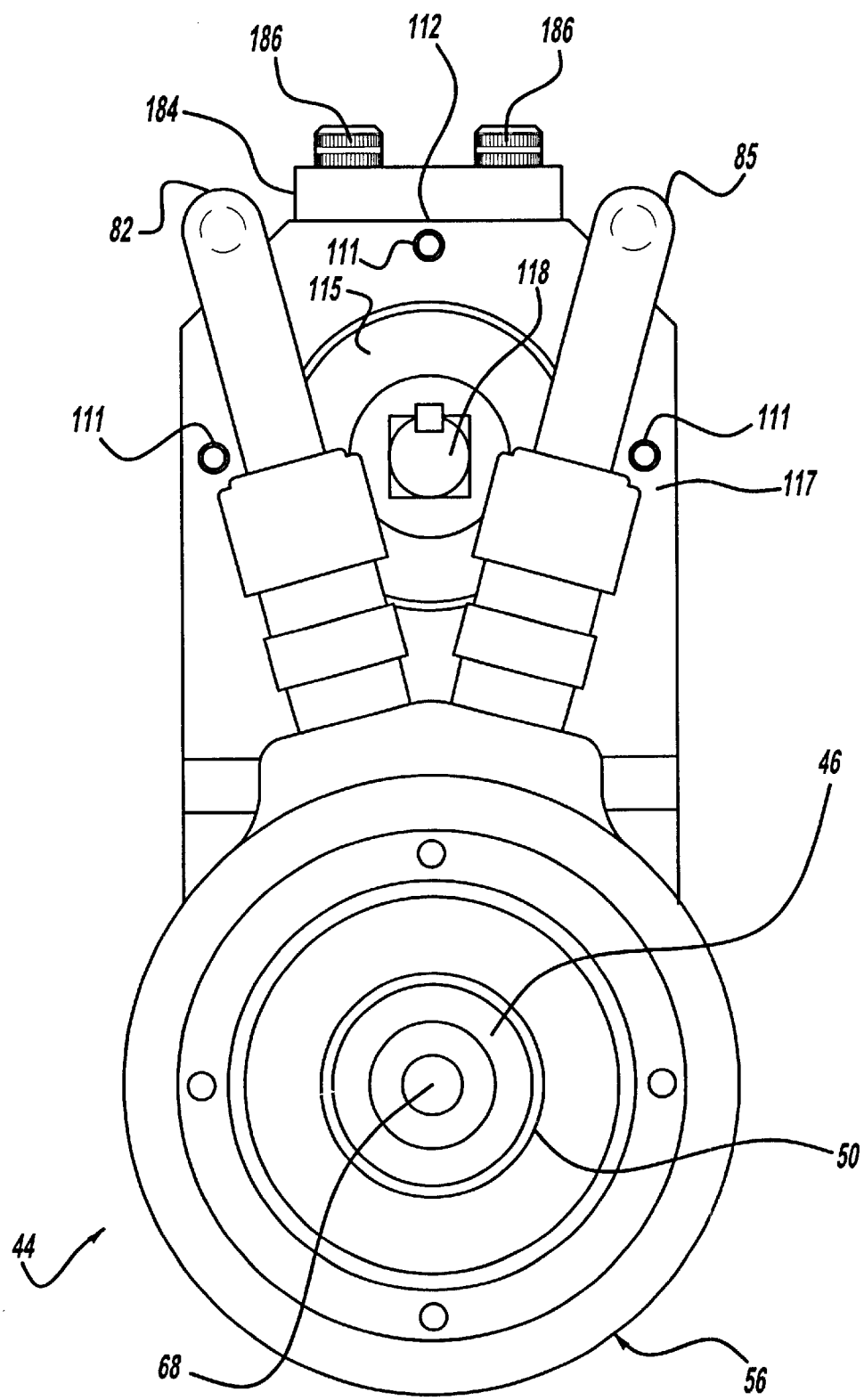
FIG. 7 is an end view to enlarged scale of the installation tool of FIGS. 5 and 6 taken generally in the direction of the Arrows 7—7 in FIG. 5.
Figure 8:
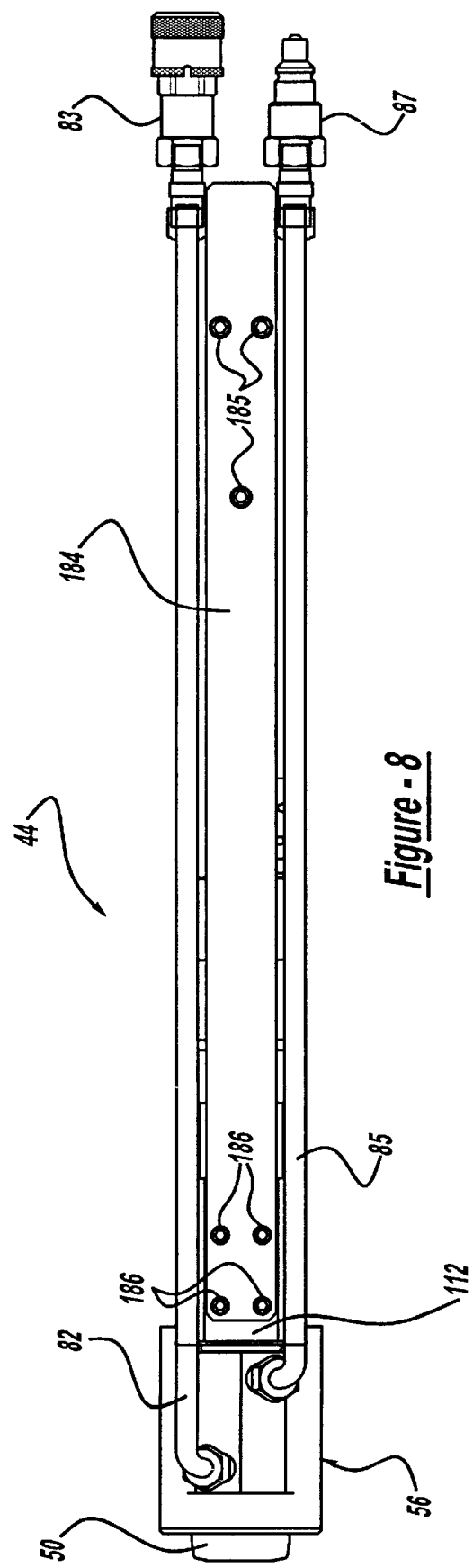
FIG. 8 is a top elevational view of the installation tool of FIG. 5.
Figure 9:
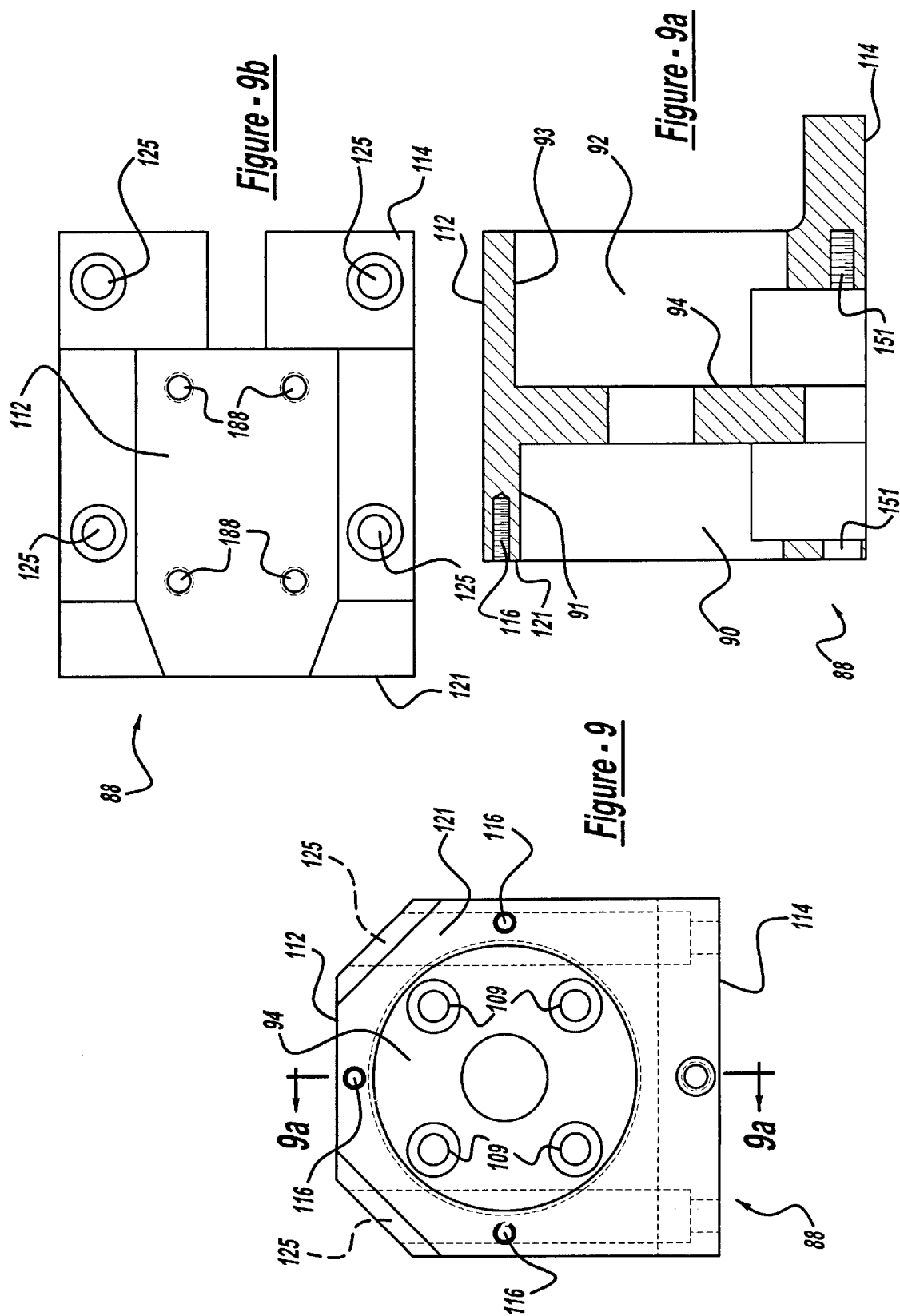
FIG. 9 is an end view of the motor mount housing of the installation tool.
Figure 10:
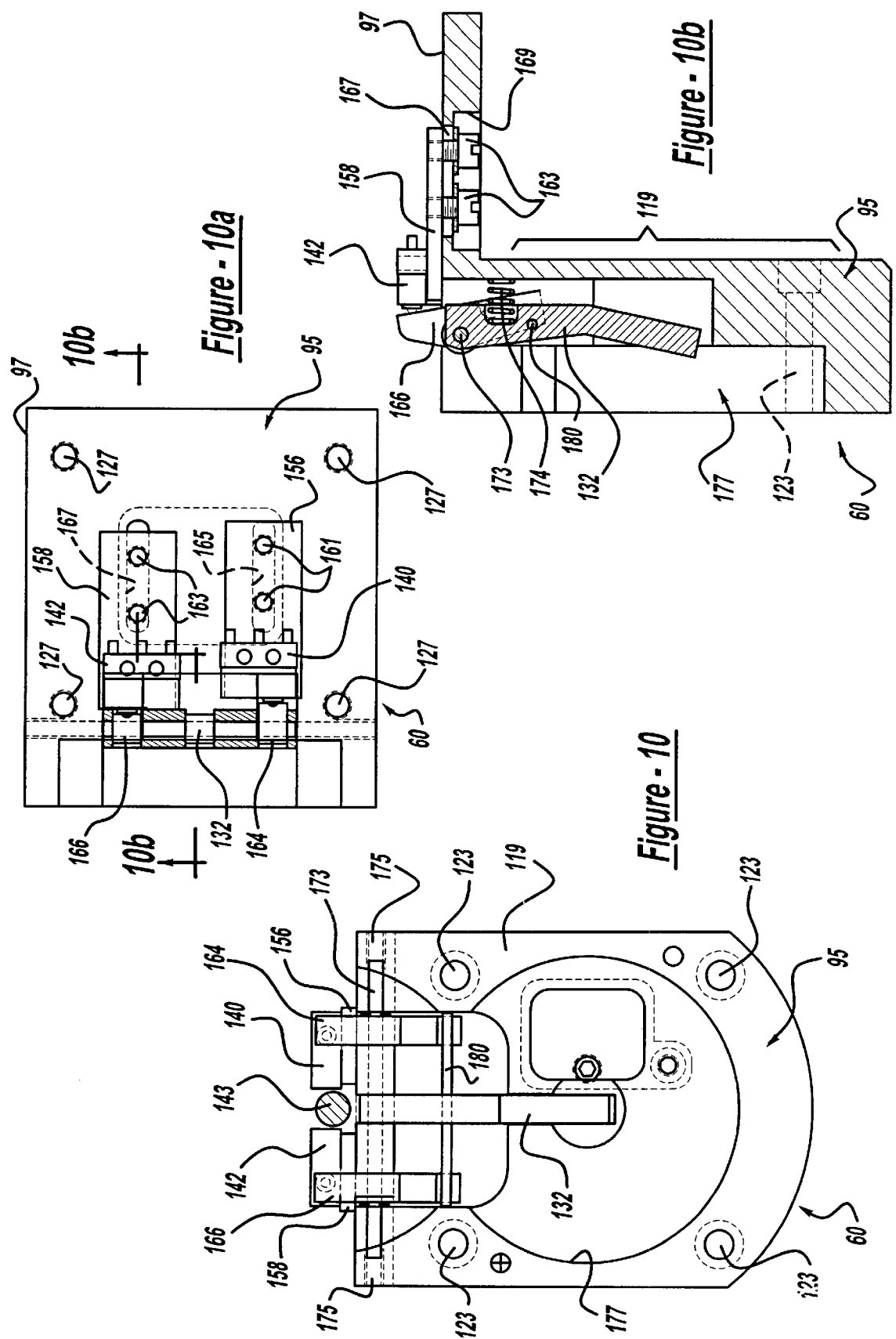
FIG. 10 is an end view of the mounting bracket and sensor housing of the installation tool.
Figures 11, 11A:
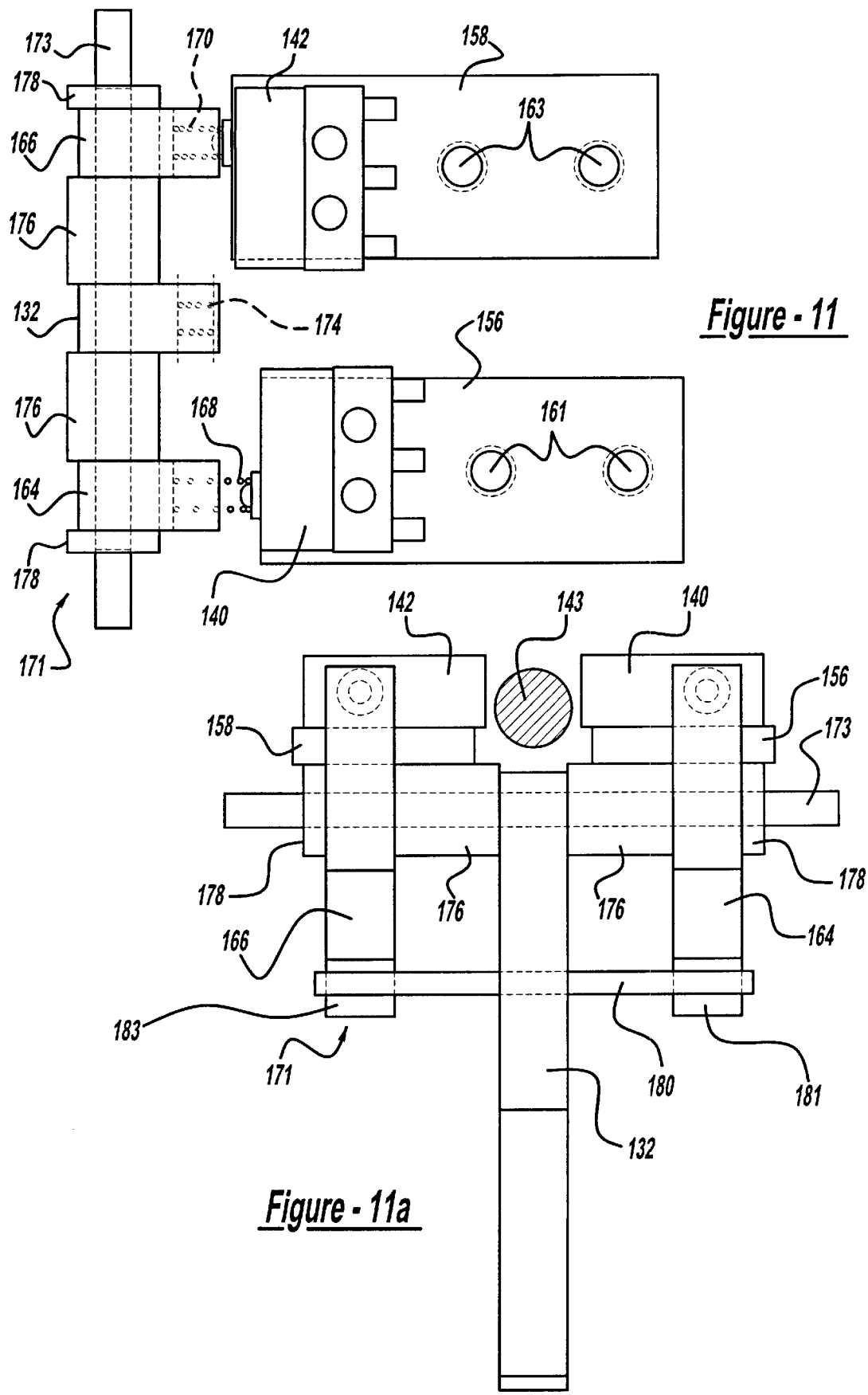
FIG. 11 is a top elevational view of the position sensing apparatus of the installation tool.
FIG. 11a is a front elevational view of the position sensing apparatus of FIG. 11.

Looking now to FIG. 6, the axial clearance capability of the tool 44 is substantially determined by the overall axial length L of the swage section 56 and sensor section 60 which is determined to a great extent by the axial length L' of the cylinder housing 76. In the present invention, the cylinder length L' is minimized in part by the unique operational arrangement for the relative movement between the swage anvil 50 and the nut member 46. In the noted patents to Fulbright et al the installation tool has a generally conventional operational arrangement of the swage anvil and nut member. There the nut member which threadably grips the pin shank is connected to the piston rod of a reciprocating drive piston and thus is mounted for axial movement relative to the swage anvil which is held stationary with the tool. With this construction the fixed swage anvil overengages the collar in swage as the nut member is moved axially rearwardly by the piston relative to the swage anvil. Since the swage anvil and nut member are generally in line prior to swage, this requires a corresponding increase in length of the cylinder housing 76. In the tool 44 of the present invention, the nut member 46 is held axially fixed to the tool 44 while, as noted, the swage anvil 50 is connected to the piston rod 104 and is movable axially forwardly to overengage the collar 14 in swage. This permits a substantial reduction in the length L' of the cylinder housing 76 and thus a reduction in the overall length L of the swage section 56.

It will also be seen that the overall axial length L is further minimized by the unique construction of the sensor section 60 which results in a substantial reduction in and minimization of the axial length L" of the transverse segment 119 of the sensor housing 95 at the back side of the cylinder housing 76.

At the same time it can be seen that the swage stroke is now provided with the fluid pressure applied to the back side 105 of the piston head 102 instead of the front side 103 from which the piston rod 104 extends. This provides for a larger area for the fluid pressure to react against for the swage stroke. The axial force and hence pressure for swaging the collar 14 is substantially greater than that required for ejection of the swaged collar 14. Thus the piston head 102 can be reduced in diameter for the same pressure and swage force permitting the diameter of the cylinder housing 76 to be reduced thereby minimizing the transverse or lateral dimension T to the central axis Xs and the overall lateral dimension T' of the cylinder housing 76 to further increase the access of the tool 44 for limited clearance applications. In this regard it is routine for conventional swage type tools which grip the pintail with gripping jaws to have the jaws moved rearwardly by the piston relative to the swage anvil in swage.

See for example U.S. Pat. No. 4,580,435 issued Apr. 8, 1986 for "Insallation Tool For Pull Type Fasteners", U.S. Pat. No. 4,587,829 issued May 13, 1986 for "Lightweight, High Pressure Fastener Insallation Tool And System", and U.S. Pat. No. 5,598,619 issued Feb. 4, 1997 for "Hydraulic Insallation Tool." It should be noted that swage type tools for installing the conventional swage type fasteners have been made with the gripping jaws held axially fixed and secured to the pintail while the swage anvil moves forwardly in swage.

However, the optimization of the lateral clearances of the unique construction of the tool 44 are particularly advantageous for installing the swage type threaded fasteners 10 especially in view of the minimization of the overall axial length L of the swage section 56.

Thus looking now to FIGS. 1 and 6 the transverse dimension T is the maximum transverse distance from the center line or axis Xs of the swage section 56 and hence of the cylinder 78, piston 80 and nut member 46 to the outer edge of the cylinder housing 76. This then defines the amount of lateral clearance relative to the inner depth dimension Tw from the center line Xf of the fastener 10 to the inner surface of the center plate 31 of the C-channel workpiece 26. Conversely the overall transverse dimension T' of the swage section 56 defines the amount of lateral clearance relative to the overall lateral depth Tw' of the cavity of the C-channel workpiece 26 from the outer edge of the upper plate 27 to the inner surface of the center plate 31. Thus it can be seen that the unique construction of the insallation tool 44 of the present invention permits the lateral dimension T to be minimized and the overall lateral dimension T' to be selectively sized to provide a significant range of clearances relative to the inner lateral depth dimension Tw and the overall lateral depth dimension Tw' of the C-channel workpiece 26. It should be noted that the unique construction described above also results in the tool 44 being of a substantially lighter weight.

As can best be seen in FIG. 6, the swage section 56 is constructed with a plurality of fluid seals such as seals 62, 64 and 66 to provide sealing between the various components. The design and application of such sealing structures are well known in the art and hence are not described in detail.

As noted the threaded actuation of the nut member 46 is provided by the driving connection with the rotary drive section 58. The rotary drive section 58 includes a motor mount housing 88 which has a front segment 90 and a rear segment 92, respectively, divided by a center plate 94. The rear housing segment 92 has a generally circular cavity 93 adapted to receive the front end of the air motor 70, which is of a similar circular contour, with a generally close clearance fit. The air motor 70 is secured to the center plate 94 in the cavity 93 by a plurality of bolts 101 which extend through counter-bored openings 109 in the center plate 94. The motor mount housing 88 is of a generally rectangular construction with a generally flat top plate 112 and flat bottom plate 114.

The front housing segment 90 of the motor mount housing 88 also has a generally circular cavity 91 which receives a drive gear 96 which is drivingly connected at its inner end to a drive shaft or spindle 110 of the air motor 70 by a typical key, slot connection.

The drive gear 96 has an axially forwardly extending boss 113 which is supported in a bushing 115. The bushing 115 in turn is secured to a cover plate 117 which in turn is removably fastened to the outer end of the front segment 90 by a plurality of bolts 111 secured in threaded bores 116 in the outer surface 121 of the front segment 90.

The sensor section 60 has a mounting bracket and sensor housing 95 which has a radially transverse housing segment 119 which is connected to the axially rearward end of the cylinder housing 76 by a plurality of fasteners (not shown) located in counterbored through bores 123. The enlarged heads of the fasteners (not shown) will be located in the counterbores to provide a flush assembly, see FIG. 10. The bracket, sensor housing 95 has a rearwardly extending support plate 97. The motor mount housing 88 is secured to the bracket, sensor housing 95 by a plurality of bolts (not shown) connected between the support plate 97 and the motor mount housing 88 by way of through bores 125 in the motor mount housing 88 and threaded bores 127 in the support plate 97. Thus the support plate 97 is adapted to hold the rotary section 58 with the pneumatic air motor 70 in a radially offset position relative to the swage section 56. As such the central axis Xm of the rotary air motor 70 and hence of drive shaft 110 extends in parallelism to the central axis Xs of the cylinder housing 76 of the swage section 56.

The nut member 46 is rotatably mounted and slidably supported within the swage cavity 52 of anvil member 50. Nut member 46 is rotatably driven around the tool axis Xs by the reversible air motor 70. The drive system connecting the air motor 70 with the nut member 46 includes the drive gear 96, previously described, an intermediate, idler gear 98, and an output gear 99. The output gear 99 is integrally formed with an elongated tubular drive shaft 100. Drive shaft 100 extends axially through piston 80 but can rotate relative thereto to impart the rotary drive force to nut member 46.

The nut member 46 is located at the outer end of an elongated, reduced diameter coupling shaft 129. The coupling shaft 129 is located within an enlarged diameter bore 131 at the outer end of the drive shaft 100. The coupling shaft 129 is threadably connected in the bore 131 whereby the nut member 46 can be fixed to the drive shaft 100 for rotation for threaded engagement onto the pull portion 34 of the pin 12. In this regard the nut member 46, after being threadably secured to the drive shaft 100, is fixed from rotation relative to the drive shaft 100 by a rod section 135 of a set screw 138. The set screw 138 has a head portion 139 threadably engaged in a threaded counterbore in a through bore 157 in the drive shaft 100 with the rod section 135 located in a slot 159 in the coupling shaft 129. A plurality of such slots 159 can be provided to permit selected adjustment of the axial position of the nut member 46 and also of the sensing rod 68 relative to the swage cavity 52 of the swage anvil 50.

The fluid piston 80 divides the fluid cylinder 78 into forward and rearward chambers 106 and 108, respectively. Introduction of pressurized hydraulic fluid through port 84 via fluid line 85 into the rearward cylinder chamber 108 causes a hydraulic force to be exerted on the back side 105 of piston head 102 to drive the piston 80 axially forwardly relative to the cylinder housing 76 for moving the swage anvil 50 axially forwardly to swage the collar 14. Introduction of pressurized fluid through port 86 via fluid line 82 into the forward cylinder chamber 106 causes a hydraulic force to be applied to the front, piston rod side of piston head 102 causing it to move axially rearwardly, i.e. to the position shown in FIGS. 5 and 6, to eject the swage anvil 50 from the collar 14 after swage. Fluid lines 82 and 85 have fluid connectors 83 and 87, respectively, for connection to fluid lines from the fluid pressure source 69 of the controller system 67 of FIG. 12.

As noted the rotary air motor 70 is attached to the rear housing segment 92 in a radial orientation such that the motor rotational axis Xm extends parallel to the central housing axis Xs. The motor shaft 110 drives the drive gear 96 that meshes with the idler gear 98 which is in driving engagement with the output gear 99 which is integrally formed with the drive shaft 100. The drive shaft 100 in turn is connected to the nut member 46 via the coupling shaft 129 as previously described.

The idler gear 98 is rotatably supported on a bearing 120 which in turn is supported on an idler gear shaft 143. The gear shaft 143 in turn has an enlarged head portion 145 supported against a flange section 147 at the rear of the cylinder housing 76 with a threaded shank portion 149 threadably connected to an end threaded bore 151 in the bottom plate 114 of the motor housing 88. A forward thrust plate cover 153 is held between the flange section 147 and idler gear 98. At the same time a rear thrust plate 155 is located in engagement on the inner side of the drive gear 96 and the idler gear 98.

The elongated, position sensing rod 68 extends through and is slidably supported in the output gear 99, the coupling shaft 129 and the drive shaft 100 and the nut member 46. A coil spring 136 is located in a reduced diameter bore 160 at the inner end of the drive shaft 100. The spring 136 is biased between the end of the bore 160 and a retaining ring 162 located at an intermediate position on the sensing rod 68. The retaining ring 162 is engageable with the inner end of the nut coupling shaft 129 to thereby position the outer end of the sensing rod 68 at a preselected position within the nut member 46 for detecting the extent of threaded engagement with the pull portion 34 of the pin 12. See FIGS. 1–4.

The sensing rod 68 transmits its indication of the degree of threaded engagement of the nut member 46 onto the pull portion 34 of the pin 12 to detection apparatus for providing appropriate signals to the controller system 67 for monitoring and controlling the swaging operation of the tool 44. As will be seen the detection apparatus is of a unique construction which facilitates the minimization of the axial length L" of the transverse segment 119 and thus of the overall length L of the swage section 56 and sensor section 60 to optimize use of the tool 44 in limited clearance applications such as with the C-channel workpiece 26. This can best be seen from FIGS. 6, 10, 10a, b, 11, and 11a, b. In this regard, in one form of the tool 44 the portion of the minimized axial length L" of the transverse segment 119 required to accommodate the detection apparatus could be only about 5% of the overall axial length L.

A pair of position sensing switches 140 and 142 are secured to the upper side of the support plate 97 of the bracket, sensor housing 95 by way of sensor mounts 156 and 158, respectively. The mounts 156 and 158 are secured to the support plate 97 by bolts 161 and 163, respectively, which extend through axial slots 165 and 167 in the support plate 97 whereby the relative axial positions of the switches 140 and 142 can be selectively adjusted for a purpose to be seen. The heads of the bolts 161 and 163 are located in a cavity 169 in the bottom surface of the support plate 97 whereby the bolt heads will not extend past the bottom surface to maintain the integrity of the overall lateral clearance dimension T'.

The position switches 140, 142 are actuated by a pivot assembly 171 which includes an actuating lever 132 and a pair of actuating arms 164 and 166 which are operatively associated with the sensing switches 140 and 142, respectively. The axially inner end of the transverse housing segment 119 is provided with a plurality of cavities or recesses 177 adapted to provide operative clearance for the pivot assembly 171. The actuating lever 132 is fixed to a pivot rod 173 which is rotatably mounted in spaced bores 175 at opposite sides of the innermost one of the cavities 177 (see FIGS. 10, 10a). The actuating arms 164 and 166 are supported on the pivot rod 173 for separate pivotal movement relative thereto and are spaced on opposite sides of the actuating lever 132 by spacers 176 and 178. The actuating lever 132 is resiliently biased by a spring 174 into engagement with the axially inner end of the sensing rod 68. In this regard the lower end of the actuating lever 132 is angulated axially forwardly in clearance with a counterbore at the outer end of output gear 99 to assist in minimizing the axial length L" of the transverse segment 119. At the same time the actuating arms 164 and 166 are resiliently biased by springs 168 and 170, respectively, into engagement with their associated switches 140 and 142. Such engagement maintains the switches 140 and 142 in their open, deactuated conditions but will be automatically placed in their closed, actuated conditions upon disengagement of the actuating arms 164 and 166. As will be seen the actuating lever 132 has an actuating bar 180 located at a position below the pivot rod 173 and extends outwardly on opposite sides of the actuating lever 132 with the extension portions in spaced, confrontation relative to grooves 181 and 183 at the bottom ends of the actuating arms 164 and 166.

Thus during rotary motion of nut member 46 onto pin pull portion 34 (FIG. 2) and in response to its axial movement onto the pin shank 18, the outer end of the sensing rod 68 engages the end face of the pin shank 18. The sensing rod 68 is then moved axially rearwardly (as in FIG. 2) so that the actuating lever 132 pivots moving actuating bar 180 axially rearwardly a relatively slight distance. This slight movement also can cause pivotal movement of the actuating arms 164 and 166 relative to the associated position sensing switches 140 and 142. As noted the actuating arms 164 and 166 are resiliently biased by springs 168 and 170 into engagement with the two electric position sensing switches 140 and 142. The first position sensing or swage switch 142 is located a very slight distance to the rear of the second position sensing or snub switch 140 such that second position sensing switch 140 is actuated before first position sensing switch 142. Thus the actuating bar 180 will be moved into engagement with the second actuating arm 164 before engagement with the first actuating arm 166. As noted the position sensing switches 140 and 142 are deactivated or open when the switch buttons are operatively engaged by the respective actuating arms 164 and 166. Such engagement is shown in the drawings, see FIGS. 6, 10a, b and 11. For example, the second position sensing switch 140 would be actuated when nut member 46 was only partially threaded onto the threads of pull portion 34, i.e. only two threads instead of the desired four threads and the actuating bar 180 engages the actuating arm 164 to move it out of engagement with the switch button of the position sensing switch 140. On the other hand, the position sensing switch 142 would be actuated only after the nut member 46 had been fully threaded the desired amount onto the threads of the pull portion 34, i.e. four threads, and the actuating bar 180 subsequently engages the actuating arm 166 to move it out of engagement with the switch button of the position sensing switch 142.

Thus the actuation point for the position sensing or swage switch 142 is predetermined and can be selected so that nut member 46 will be threaded a known distance onto the threads of pull portion 34 such that a sufficient number of threads on the pull portion 34 are engaged to fully accept the reaction loads for the swaging of the collar 14 into the lock groove portion 30.

It can be seen, however, that the selective adjustment of the relative positions of the switches 140 and 142 permits the tool system to be calibrated to compensate for dimensional variations in tool components, wear, adjustment of the axial position of the nut member 46 and sensing rod 68 relative to the swage cavity 52, as previously discussed, and the like.

Position switches 140, 142 are incorporated into the controller system 67 which includes a programmable controller 144; the programmable controller 144 includes a manually operable trigger switch 146 located on the tool 44 itself and actuable by the operator for initiating the insallation cycle by energizing motor 70 via air supply 71 and starting a timer 148. Assuming that the position switch 142 is actuated within the time period allowed by the timer 148, i.e. approximately one or two seconds, the programmable controller 144 will signal the air supply 71 to de-energize motor 70 and then energize a solenoid valve 150 controlling flow of hydraulic fluid from the fluid pressure supply 69 to port 84 (FIG. 6). With motor 70 and nut member 46 motionless, the hydraulic fluid will act on the back side 105 of the piston head 102 to effectively move the piston 80 axially forwardly, thereby moving anvil 50 forwardly relative to nut member 46 to perform the swaging operation on collar 14. In this mode the high pressure output line from fluid source 69 will be connected to the solenoid valve 150.

As the anvil 50 reaches the end of the swage stroke it generates high back pressure on the fluid in the line leading to port 84. The high back pressure operates a second fluid pressure switch 154 to signal the programmable controller 144 to actuate the solenoid valve 150 to its original condition relative to ports 84 and 86. Port 84 is thus connected to a drain or return line, while port 86 is connected to the high pressure side of the fluid pressure source 69 until return and then held there under a low idle pressure. As noted this provides the high pressure to the front side 103 of the piston head 102 from which the piston rod 104 extends. Accordingly, the piston 80 and piston rod 104 with the swage anvil member 50 are moved rearwardly to their FIG. 4 positions ejecting the swaged collar 14 from the swage cavity 52 of anvil 50. A second fluid pressure switch 154 in the line leading to port 86 responds to back pressure to signal the programmable controller 144 to energize motor 70 via the air source 71 in the reverse direction, whereby nut member 46 is spun off of the threads on pull portion 34 to approximate the condition shown in FIG. 1.

The position switch 140 is in the nature of a safety switch to enable the programmable controller 144 to provide a second chance at achieving a collar swage action if nut member 46 is initially threaded an insufficient distance onto pin pull portion 34 for swage. In this case, if the timer 148 times out and snub load position switch 140 is actuated but the swage load position switch 142 is not actuated this signifies a minimal but insufficient threading of nut member 46 onto pull portion 34. The time period for the first actuation of switch 140 is around 5 to 10 seconds. If switch 140 is not actuated in that time period the controller 144 will abort the cycle and bring the system 67 back to its original state requiring another actuation of the trigger switch 146. Thus in response to these signals from switches 140 and 142 and timer 148 the programmable controller 144 actuates the solenoid valve 150 to provide hydraulic fluid at a predetermined low, holding pressure to port 84. This holding pressure will be less than the full pressure for swage but of a sufficient, low magnitude only to move swage anvil 50 against the end of collar shank 40 to take up the gap between or to snub the workpieces 24 and 26 together. In this regard the first fluid pressure switch 152 senses the magnitude of pressure to port 84 and will generate a signal when the low holding pressure is attained; in response the controller 144 will interrupt the cycle and return the piston 80 to its return position. Thus when the gap is taken up, the programmable controller 144 will have returned the piston 80 to its original position and will again initiate the timer 148 to give the air motor 70 a second chance to thread nut member 46 the required distance onto pull portion 34 for swage. If the position switch 142 is now actuated on the second attempt, then the swaging operation will be carried out in the desired fashion as previously described. If the switch 142 is not actuated on the second attempt, the programmable controller 144 will return the controller system 67 to its return condition, reversing the pressure at ports 84 and 86 and actuating the air supply 71 to unthread the nut member 46 from the pull portion 34.

Thus the controller system 67 is designed so that the swaging operation will not be attempted until after second position switch 142 has been actuated, i.e., until the system is assured that nut member 46 has been threaded a sufficient distance onto pull portion 34 to adequately resist the axial loads imposed by the swaging operation.

In a similar manner controller system 67 will not initiate the actuation of the pull up or snubbing of the workpieces via the low holding pressure if the position switch 140 is not actuated within a time prescribed by timer 148, i.e. less than around two threads engaged. Again the nut member 46 will be unthreaded from pull portion 34 without the application of fluid pressure and without application of a relative axial pulling force to the fastener 10.

It should be noted that the reaction of the relative tensile load applied by the swage anvil member 50 to the collar 14 in swage is reacted by the output gear 99 against the confronting external surface of the cylinder housing 76 by virtue of the engagement of the nut member 46 with the pull portion 34 of the pin 12. However, the reaction of the lower magnitude compressive load for ejection of the anvil member 50 from the swaged collar 14 is reacted by a resilient snap ring 172 against the inner surface of the cylinder 78. The resilient snap ring 172 is located in a groove in the drive shaft 100 proximate to the inner surface of the cylinder 78 and upon completion of ejection of the swaged collar 14 it will resiliently return the output gear 99 to a neutral position to facilitate rotation without undue friction.

In one form of the rotary drive section 58 a reversible air motor 70 of a type Model No. MMR-0002X by Micro Motors, Inc. of Santa Ana, Calif., U.S.A. was utilized; at the same time a programmable controller 144 of a type produced by DeVilbiss U.S.A. was used and can be programmed to provide the noted sequence of operation by one skilled in the art.

As noted the tool 44 of the present invention is of a construction which facilitates use in close clearance applications but also is of a lightweight construction and lends itself to adaptation for a variety of manual handling conditions for different applications. Thus looking now to FIGS. 5 and 8 the tool 44 is shown with a handle 182 connected at one end to an extension bar 184 by a plurality of bolts 185. The handle 182 has the trigger switch 146 which is operatively connected to the controller system 67 via an electric connector 190 by an electric cord (not shown). Thus in order to actuate the tool 44 the operator merely pulls the trigger switch 146 which will initiate the operating cycle of the tool 44 as previously described.

Figure 5:
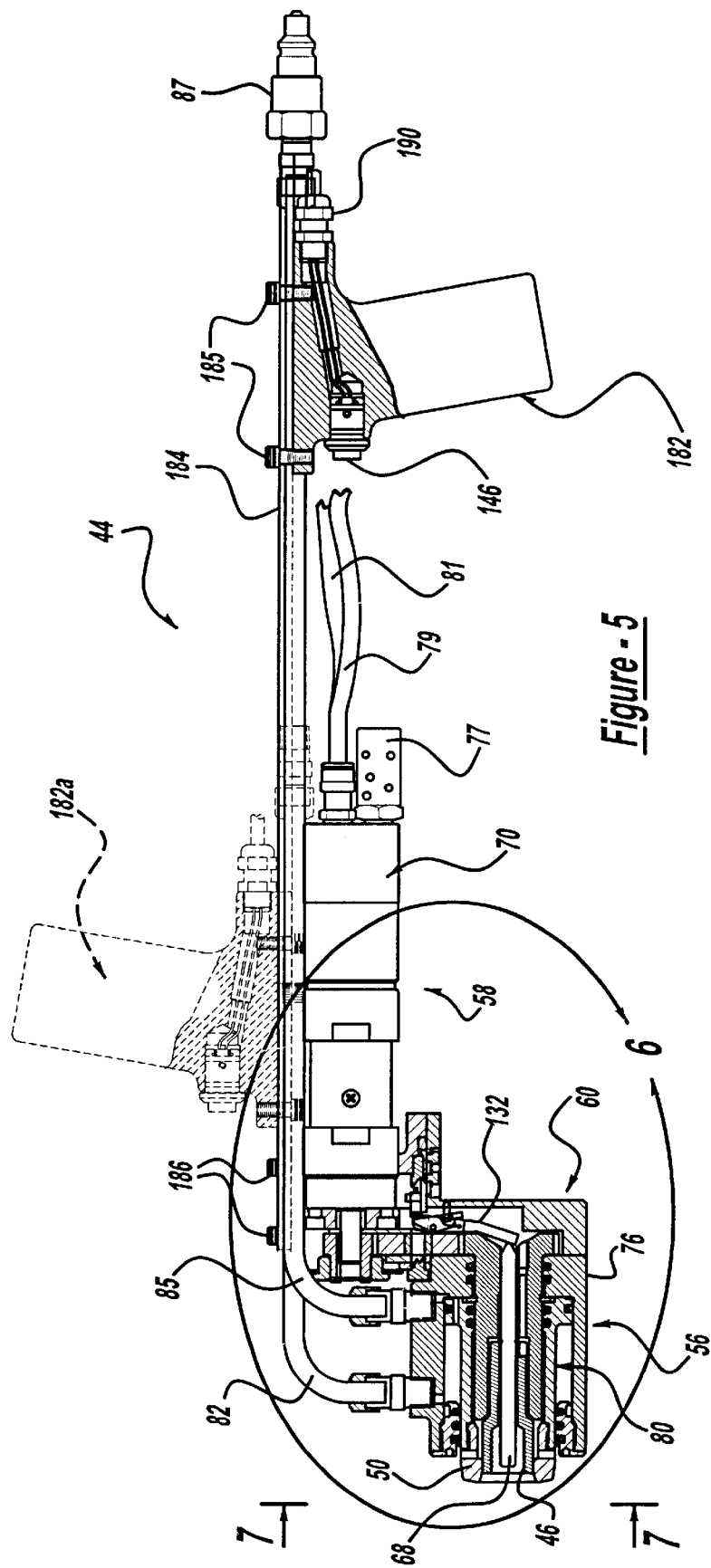
FIG. 5 is a side elevational view of the installation tool of the present invention for use with the controller system shown in FIG. 12 with some parts shown in section and including an alternate handle arrangement shown in phantom.

As can be seen, the opposite end of the extension bar 184 is fastened to the flat top plate 112 of the motor mount housing 88 by a plurality of bolts 186 threadably engaged in the threaded bores 188 in the top plate 112. It can be seen that the length of the extension bar 184 can be readily modified to fit different applications while the remainder of the tool 44 is unchanged. At the same time the handle 182 can be located in a variety of angular positions relative to the remainder of the tool 44. Thus FIG. 5 shows a handle 182a located more proximate to the rest of the tool 44 but also in a 180° inverted position relative to the handle 182. Likewise, right angled brackets fastened to the top plate 112 of the motor housing 88 could be utilized whereby the handle 182 could be located in 90° positions relative to the handle 182 as shown. The extension bar 184 is of a generally rectangular construction and structured to provide adequate stiffness for handling by the operator.

It should be noted that the fluid ports 84 and 86 to the cylinder 78 and the associated fluid lines 85 and 82, respectively, are positioned to be radially offset and in clearance relationship with the lateral or transverse clearance dimension T'. In this regard the fluid lines 82 and 85 extend along opposite sides of the extension bar 184 and thus can be readily supported along its length by retainer clips (not shown).

As noted in the patents to Fulbright et al a variation in the system could be provided in which there is no position sensing rod 68. Instead, the nut member (such as nut member 46) of the tool would be rotated until the end face in the cavity of the nut member abuts against the end surface of the pin shank (such as pin shank 18). When this occurs a back pressure is developed at a reversible air motor (such as motor 70) used to rotate nut member. Such a back pressure can be sensed by the controller system (such as controller system 67) and upon attainment of a known magnitude can generate a signal to stop the air motor. After nut member stops rotating, the swage anvil member is driven axially and radially over the collar to swage the collar material into the threads of lock groove portion on the pin shank. Thus the operation of such a tool is generally similar to that of the tool 44, one difference being that the magnitude of air pressure on the motor (such as 70) is sensed instead of nut position on the pin via a sensing rod 68 and such pressure signal is used to halt rotation of nut member. In this case, however, the repeatability factor noted with the embodiment of tool 44 as described would not be present.

It should be noted that other groove forms could be used for the locking grooves and pull grooves. For example the pull grooves could be in the form of a multiple thread; with a mating thread on the nut member the full engagement could occur with fewer turns of the nut member.

In this regard, it should also be noted that, as shown in the patents to Fulbright et al, the pin could be formed with an internal gripping thread in a bore at the outer end of the pin shank which would be engaged by a threaded pull rod on the tool. Alternatively, a combination of internal and external threads on the pin shank could be threadably engaged by a nut member and a threaded pull rod on the tool. Thus a variety of rotary threaded members could be utilized in the present invention having them maintained in a substantially fixed axial position as the nut member 46.

While it will be apparent that the preferred embodiments of the invention disclosed is/are well calculated to fulfill the objects above stated, it will be appreciated that the invention is susceptible to modification, variation and change without departing from the proper scope or fair meaning of the invention.

What is claimed is:

1. A tool for securing a plurality of workpieces with a multi-piece swage type fastener which includes a pin adapted to extend through aligned openings in the workpieces and a tubular collar adapted to be located on the pin and swaged into locking grooves on the pin with the pin having a pull portion with helical pull grooves, said tool comprising:

a swage section, a rotary drive section and a sensor section operatively connected together, said swage section including a rotary nut member threadable onto the pull portion of the pin and being rotatably supported from a substantially fixed axial position, said swage section further including an annular swage anvil having a swage cavity with an inner diameter less than the outer diameter of the collar, said rotary nut member located radially inwardly in said swage cavity of said swage anvil and adapted to rotate relative to said swage anvil and with said swage anvil being supported for axial movement relative to said nut member in said fixed axial position, said rotary drive section including rotary means operable for rotating said nut member for threaded engagement onto and disengagement from the pull portion of the pin, said swage section including annular fluid piston-cylinder means comprising a fluid cylinder having a central axis and a piston supported in said cylinder for axially reciprocating movement along said central axis in response to fluid pressure in said cylinder for applying a relative axial force between said swage anvil and said nut member and for applying such axial force of a first magnitude after said nut member has been threaded to a first predetermined position onto the pull portion of the pin whereby said swage anvil is moved axially forwardly and outwardly relative to said nut member to radially overengage the collar to swage the collar into the locking grooves on the pin, said sensor section including first sensor means operatively connected with said nut member for detecting the amount of threaded engagement of said nut member with the pull portion of the pin and second sensor means detecting the completion of swage of the collar, control means operatively connected with said rotary means and responsive to a signal from said first sensor means indicating the location of said nut member at said first predetermined position on the pull portion of the pin for halting rotary motion of said nut member by said rotary means and actuating the application of fluid swage pressure to said piston for applying the axial force of said first magnitude for swaging, said control means responsive to a signal from said second sensor means for actuating the application of ejection pressure to said piston for ejecting said swage anvil from the collar after swage, said piston including a piston head slidably supported in said cylinder and a piston rod extending axially forwardly from the outer end of said piston head and having an end section connected to said swage anvil for axially reciprocating movement of said swage anvil forwardly for swage and rearwardly for ejection whereby the overall axial length of said cylinder and hence overall effective length of said swage section can be minimized for use of the tool in limited clearance applications, fluid pressure means connected to said cylinder and responsive to said control means for applying the swage pressure into said cylinder on the inner end of said piston head and the ejection pressure to said cylinder on the outer end of said piston head with said piston rod and with said piston head thereby providing a larger effective pressure responsive area to achieve the magnitude of relative axial force required for swage which is substantially greater than the relative axial force required for ejection after swage by fluid pressure applied to said cylinder at the outer or piston rod end of said piston head whereby the diameter of said piston head and hence effective diameter of said cylinder can be minimized for use of the tool in limited clearance applications.

2. The tool of claim 1 with said rotary means comprising a rotary motor operatively connected to said rotary nut member for rotating said nut member independently of said swage anvil, housing means operatively securing said rotary means, said piston-cylinder means and said swage anvil together, said housing means supporting said rotary motor at a position axially spaced and radially offset from said piston-cylinder means with said rotary motor having a motor axis of rotation being generally parallel to said central axis of said cylinder whereby the end of said piston-cylinder means axially opposite from said swage anvil is clear from said rotary motor for use of the tool in limited clearance applications.

3. The tool of claim 2 including a drive shaft connected to said nut member extending axially from said nut member through said fluid piston-cylinder means including said piston rod and said piston head of said piston.

4. The tool of claim 3 with said rotary means further comprising gear drive means located generally at said opposite axial end of said piston-cylinder means and extending radially between said rotary motor and said drive shaft for rotation of said drive shaft and hence of said nut member by said rotary motor.

5. The tool of claim 4 with said gear drive means of said rotary means including a drive gear connected to said rotary motor for rotation about said motor axis, an output gear connected to said drive shaft for rotation of said nut member about said cylinder axis and an idler gear rotatably supported on an axis parallel to and intermediate with said motor axis and said central axis and in driving engagement between said drive gear and said output gear whereby said rotary motor is radially and transversely spaced from said swage section a preselected distance to facilitate use of the tool in limited clearance applications.

6. The tool of claim 1 further including adjustment means for selectively adjusting the axial position of said nut member within said swage cavity.

7. The tool of claim 1 with said control means including timing means for actuating said rotary means to unthread said rotary nut member if said first predetermined position has not been attained by said rotary nut member within a predetermined time period.

8. The tool of claim 1 with said first sensor means including a sensing rod extending axially through said nut member, said piston and said cylinder and having a forward end adapted to engage an end surface of the pin of the fastener and a rearward end extending axially rearwardly and outwardly from said cylinder, said sensing rod being axially movable relative to said nut member whereby the extent of axial movement of said rearward end relative to said nut member will provide an indication of the extent of threaded engagement of said nut member with the helical pull grooves of the pin, said first sensor means including at least a first electric switch operatively connected to said sensing rod for actuation in response to axial movement of said sensing rod by the pin, said first switch supported at a position radially offset from said central axis of said cylinder, said first sensor means including pivot means for providing a radially extending connection between said rearward end of said sensing rod and said first electric switch for transmitting the amount of axial movement of said sensing rod to said first switch for actuation of said first switch when said nut member has been threaded onto the pull portion of the pin to said first predetermined position and with said first switch providing a first signal to said control means for actuating the application of fluid swage pressure to said cylinder and hence to said piston whereby said swage anvil is moved axially to swage the collar into the locking grooves of the pin.

9. The tool of claim 8 with said control means operatively connected with said rotary means for halting rotary motion of said nut member by said rotary means prior to the application of fluid swage pressure to said cylinder and hence to said piston to provide the relative axial force of said first magnitude between said nut member and said swage anvil for swaging the collar.

10. The tool of claim 9 with said control means including timing means for actuating said rotary means to unthread said rotary nut member without the application of fluid pressure on said piston if said first predetermined position of said rotary nut member on the pull portion of the pin has not been attained by said rotary nut member within a predetermined time period.

11. The tool of claim 8 with said pivot means comprising an actuating lever being pivotally supported on a pivot rod having an axis radially offset from and extending transversely to said central axis, said actuating lever extending radially from said pivot rod and to a position in engagement with said rearward end of said sensing rod, a first actuating arm pivotally supported on said pivot rod and operatively connected with said actuating lever for operative engagement with said first electric switch, said actuating lever being operable in response to axial movement of said sensing rod indicating threaded engagement of said nut member onto the pull portion of the pin to said first predetermined position to actuate said first actuating arm to actuate said first electric switch to provide said first signal to said control means for actuating the application of fluid swage pressure to said piston.

12. The tool of claim 11 with said sensing means including calibration means operatively connected with said first switch for selective adjustment of said first switch relative to said first actuating arm to provide actuation of said first switch in response to movement of said sensing rod indicating threaded engagement to said first predetermined position.

13. The tool of claim 8 with said sensing means including a second electric switch operatively connected to said sensing rod for actuation in response to axial movement of said sensing rod by the pin, said second switch supported at a position radially offset from said central axis of said cylinder, said pivot means also providing a radially extending connection between said rearward end of said sensing rod and said second electric switch for transmitting the amount of axial movement of said sensing rod to said second electric switch for actuation of said second switch when said nut member has been threaded onto the pull portion of the pin only to a second predetermined position less than said first predetermined position and for providing a second signal to said control means for actuating the application of fluid pressure of a magnitude less than that for the swage pressure and less than initiation of swage for pulling the workpieces together, said control means actuable thereafter to initiate actuation of said rotary means for a second attempt at threading said nut member onto the pull portion of the pin to said first predetermined position for actuation of swaging action.

14. The tool of claim 13 with said pivot means comprising an actuating lever being pivotally supported on a pivot rod having an axis radially offset from and extending transversely to said central axis, said actuating lever extending radially from said pivot rod and to a position in engagement with said end surface of said sensing rod, first and second actuating arms pivotally supported on said pivot rod and operatively connected with said actuating lever for operative engagement with said first and second electric switches respectively, said actuating lever being operable in response to axial movement of said sensing rod indicating threaded engagement of said nut member onto the pull portion of the pin to said first predetermined position to actuate said first actuating arm to actuate said first electric switch to provide said first signal to said control means for actuating the application of fluid swage pressure to said piston, said actuating lever being alternatively operable in response to axial movement of said sensing rod indicating threaded engagement of said nut member onto the pull portion of the pin only to said second predetermined position to actuate said second actuating arm to actuate said second electric switch to provide said second signal to said control means for actuating the application for fluid pressure less than swage pressure.

15. The tool of claim 14 with said sensing means including first calibration means operatively connected with said first switch for selective adjustment of said first switch relative to said first actuating arm to provide actuation of said first switch in response to movement of said sensing rod to a position indicating threaded engagement to said first predetermined position for swaging, said sensing means also including second calibration means operatively connected with said second switch for selective adjustment of said second switch relative to said second actuating arm to provide the predetermined actuation of said second switch in response to movement of said sensing rod to a position indicating threaded engagement to said second predetermined position for the application of pressure less than swage pressure for pulling the workpieces together.

16. The tool of claim 15 with said pivot means including said actuating lever and said first and second actuating arms being constructed to extend radially from said cylinder axis and supported in a housing portion at the axial end of said swage section opposite said swage anvil with said housing portion being of a minimal axial length whereby the tool can be utilized in limited clearance applications.

17. A compact tool for securing a plurality of workpieces with a multi-piece swage type fastener which includes a pin adapted to extend through aligned openings in the workpieces and a tubular collar adapted to be located on the pin and swaged into locking grooves on the pin with the pin having a pull portion with helical pull grooves and with the tool adapted to install such fasteners in limited clearance applications, said tool comprising:

a swage section, a rotary drive section and a sensor section operatively connected together, said swage section including a rotary nut member threadable onto the pull portion of the pin and being rotatably supported from a substantially fixed axial position, said swage section further including an annular swage anvil having a swage cavity with an inner diameter less than the outer diameter of the collar, said rotary nut member located radially inwardly of said swage cavity and adapted to rotate relative to said swage anvil and with said swage anvil being supported for axial movement relative to said nut member in said fixed axial position, said rotary drive section including rotary means operable for rotating said nut member for threaded engagement onto and disengagement from the pull portion of the pin, said swage section including annular fluid piston-cylinder means comprising a fluid cylinder having a central axis and a piston supported in said cylinder for axially reciprocating movement along said central axis in response to fluid pressure in said cylinder for applying a relative axial force between said swage anvil and said nut member and for applying such axial force of a first magnitude after said nut member has been threaded to a first predetermined position onto the pull portion of the pin whereby said swage anvil is moved axially forwardly and outwardly relative to said nut member to radially overengage the collar to swage the collar into the locking grooves on the pin, said sensor section including sensor means operatively connected with said nut member for detecting the amount of threaded engagement of said nut member with the pull portion of the pin, control means operatively connected with said rotary means and responsive to a signal from said sensor means indicating the location of said nut member at said first predetermined position on the pull portion of the pin for halting rotary motion of said nut member by said rotary means and actuating the application of fluid swage pressure to said piston for applying the axial force of said first magnitude for swaging, said piston including a piston head slidably supported in said cylinder and a piston rod extending axially forwardly from the outer end of said piston head and having an end section connected to said swage anvil for axially reciprocating movement of said swage anvil and responsive to the magnitude of fluid pressure for applying relative axial forces between said swage anvil and said nut member for moving said swage anvil axially outwardly to radially overengage the collar for swaging and axially inwardly for ejecting the swaged collar from said swage anvil with such axial movement being relative to said nut member with said nut member held in said fixed axial position, fluid pressure means connected to said cylinder and responsive to said control means for applying the swage pressure into said cylinder on the inner end of said piston head and the pressure for ejection applied to said cylinder on the outer end of said piston head with said piston rod with said piston head thereby providing a larger effective pressure responsive area to achieve the magnitude of relative axial force required for swage which is substantially greater than the relative axial force required for ejection after swage by fluid pressure applied to said cylinder at the outer or piston rod end of said piston head whereby the diameter of said piston head and hence effective diameter of said cylinder can be minimized for use of the tool in limited clearance applications, said rotary means comprising a rotary motor operatively connected to said rotary nut member for rotating said nut member independently of said swage anvil, housing means operatively securing said rotary means, said piston-cylinder means and said swage anvil together, said housing means supporting said rotary motor at a position axially spaced and radially offset from said piston-cylinder means with said rotary motor having a motor axis of rotation being generally parallel to said central axis of said cylinder whereby the axial end of said piston-cylinder means opposite from said swage anvil is clear from said rotary motor for use of the tool in limited clearance applications, a drive shaft connected to said nut member extending axially from said nut member through said fluid piston-cylinder means including said piston rod and piston head of said piston, said rotary means further comprising gear drive means located generally at said opposite axial end of said piston-cylinder means and extending radially between said rotary motor and said drive shaft for rotation of said drive shaft and hence of said nut member by said rotary motor, said gear drive means including a drive gear connected to said rotary motor for rotation about said motor axis, an output gear connected to said drive shaft for rotation of said nut member about said cylinder axis, an idler gear rotatably supported on an axis parallel to and intermediate with said motor axis and said central axis and in driving engagement between said drive gear and said output gear whereby said rotary motor is radially and transversely spaced from said swage section a preselected distance to facilitate use of the tool in limited clearance applications, said sensor means including a sensing rod extending axially through said nut member, said piston and said cylinder and having a forward end adapted to engage an end surface of the pin of the fastener and a rearward end extending axially rearwardly and outwardly from said cylinder, said sensing rod being axially movable relative to said nut member whereby the extent of axial movement of said rearward end relative to said nut member will provide an indication of the extent of threaded engagement of said nut member with the helical pull grooves of the pin, said sensing means including first and second electric switches operatively connected to said sensing rod for actuation in response to axial movement of said sensing rod by the pin, said first and second switches supported at a position radially offset from said central axis of said cylinder, said sensing means including pivot means for providing a radially extending connection between said rearward end of said sensing rod and said first and second electric switches for transmitting the amount of axial movement of said sensing rod to said first and second switches, said pivot means comprising an actuating lever being pivotally supported on a pivot rod having an axis radially offset from and extending transversely to said central axis, said actuating lever extending radially from said pivot rod and to a position in engagement with said sensing rod, first and second actuating arms pivotally supported on said pivot rod and operatively connected with said actuating lever for operative engagement with said first and second electric switches respectively, said actuating lever being operable in response to axial movement of said sensing rod indicating threaded engagement of said nut member onto the pull portion of the pin to said first predetermined position to actuate said first actuating arm to actuate said first electric switch to provide a first signal to said control means for actuating the application of fluid swage pressure to said piston, said actuating lever being alternatively operable in response to axial movement of said sensing rod indicating threaded engagement of said nut member onto the pull portion of the pin only to a second predetermined position less than said first predetermined position to actuate said second actuating arm to actuate said second electric switch to provide a second signal to said control means for actuating the application for fluid pressure less than swage pressure to pull the workpieces together, said control means actuable after the application of fluid pressure less than swage pressure to initiate actuation of said rotary means for a second attempt at threading said nut member onto the pull portion of the pin to said first predetermined position for actuation of swaging action, said pivot means, including said actuating lever and said first and second actuating arms, being constructed with said actuating lever and said first and second lever arms being of a radially elongated and axially narrow construction and supported in a housing portion at said opposite axial end of said swage section to extend radially from said cylinder axis with said housing portion thereby being of a minimal axial length to facilitate use of the tool in limited clearance applications.

18. The tool of claim 17 further including adjustment means for selectively adjusting the axial position of said nut member relative to said swage cavity.

19. The tool of claim 17 with said sensing means including first calibration means operatively connected with said first switch for selective adjustment of said first switch relative to said first actuating arm to provide actuation of said first switch in response to movement of said sensing rod to a position indicating threaded engagement to said first predetermined position for swaging, said sensing means also including second calibration means operatively connected with said second switch for selective adjustment of said second switch relative to said second actuating arm to provide the actuation of said second switch in response to movement of said sensing rod to a position indicating threaded engagement to said second predetermined position for the application of pressure less than swage pressure for pulling the workpieces together.

20. The tool of claim 17 further including adjustment means for selectively adjusting the axial position of said nut member relative to said swage cavity, said sensing means including first calibration means operatively connected with said first switch for selective adjustment of said first switch relative to said first actuating arm to provide the predetermined actuation of said first switch in response to movement of said sensing rod to a position indicating threaded engagement to said first predetermined position for swaging, said sensing means also including second calibration means operatively connected with said second switch for selective adjustment of said second switch relative to said second actuating arm to provide the predetermined actuation of said second switch in response to movement of said sensing rod to a position indicating threaded engagement to said second predetermined position for the application of pressure less than swage pressure for pulling the workpieces together.

21. A tool for securing a plurality of workpieces with a multi-piece swage type fastener which includes a pin adapted to extend through aligned openings in the workpieces and a tubular collar adapted to be located on the pin and swaged into locking grooves on the pin with the pin having a pull portion with helical pull grooves, said tool comprising:

a swage section, a rotary section and a sensor section operatively connected together, said rotary section including a rotary threaded member having a threaded surface engageable with the helical grooves on the pull portion for threadable engagement with the pull portion of the pin to exert an axial pulling force thereon and being rotatably supported from a substantially fixed axial position, said swage section further including an annular swage anvil having a swage cavity with an inner diameter less than the outer diameter of the collar and being supported for axial movement relative to said rotary threaded member, said rotary threaded member located radially inwardly of said swage anvil and adapted to rotate relative to said swage anvil and with said swage anvil being supported to move axially relative to said rotary threaded member in said fixed axial position, said rotary section including rotary means operable for rotating said rotary threaded member for threaded engagement onto and disengagement from the pull portion of the pin, said swage section including annular fluid piston-cylinder means comprising a fluid cylinder having a central axis and a piston supported in said cylinder for axially reciprocating movement along said central axis in response to fluid pressure in said cylinder for applying a relative axial force between said swage anvil and said rotary threaded member and for applying such axial force of a first magnitude after said rotary threaded member has been threaded to a first predetermined position onto the pull portion of the pin whereby said swage anvil is moved axially forwardly and outwardly relative to said rotary threaded member to radially overengage the collar to swage the collar into the locking grooves on the pin, said sensor section including sensor means operatively connected with said rotary threaded member for detecting the amount of threaded engagement of said rotary threaded member with the pull portion of the pin, control means operatively connected with said rotary means and responsive to a signal from said sensor means indicating the location of said rotary threaded member at said first predetermined position on the pull portion of the pin for halting rotary motion of said rotary threaded member by said rotary means and actuating the application of fluid swage pressure to said piston for applying the axial force of said first magnitude for swaging, said piston including a piston head slidably supported in said cylinder and a piston rod extending axially forwardly from the outer end of said piston head and having an end section connected to said swage anvil for axially reciprocating movement of said swage anvil forwardly for swage and rearwardly for ejection whereby the overall axial length of said cylinder and hence overall effective length of said swage section can be minimized for use of the tool in limited clearance applications, said fluid piston-cylinder means including
  (a) an elongated annular housing including said fluid cylinder,
  (b) port means in said annular housing for applying fluid pressure to said fluid cylinder to produce the axially reciprocating movement of said piston in said fluid cylinder, and
  (c) a drive shaft extending axially from said rotary threaded member through said piston rod and said piston head of said piston, said rotary means including a rotary motor connected with said annular housing, a drive gear driven by said rotary motor around an axis radially spaced from and extending parallely with said central axis, an output gear centered on said central axis and adapted to be drivingly engaged with said drive gear, said drive shaft connected with said output gear, connecting means on said drive shaft connecting said drive shaft with said output gear for transmitting a rotary drive force from said drive gear to said shaft and to said rotary threaded member with said rotary threaded member being held in said substantially fixed axial position, fluid pressure means connected to said cylinder and responsive to said control means for applying the pressure for swaging into said cylinder on the inner end of said piston head and the pressure for ejecting to said cylinder on the outer end of said piston head with said piston rod and with said piston head thereby providing a larger effective pressure responsive area to achieve the magnitude of relative axial force required for swage which is substantially greater than the relative axial force required for ejection after swage by fluid pressure applied to said cylinder at the outer or piston rod end of said piston head whereby the diameter of said piston head and hence effective diameter of said cylinder can be minimized for use of the tool in limited clearance applications.

* * * * *